(12) United States Patent
Lazarev

(10) Patent No.: US 8,081,270 B2
(45) Date of Patent: Dec. 20, 2011

(54) BACKLIGHT MODULE AND LIQUID CRYSTAL DISPLAY INCORPORATING THE SAME

(75) Inventor: Pavel I. Lazarev, London (GB)

(73) Assignee: Crysoptix, KK, Tokyo (JP)

( * ) Notice: Subject to any disclaimer, the term of this patent is extended or adjusted under 35 U.S.C. 154(b) by 248 days.

(21) Appl. No.: 12/296,873

(22) PCT Filed: Apr. 13, 2007

(86) PCT No.: PCT/GB2007/001378
§ 371 (c)(1),
(2), (4) Date: Oct. 10, 2008

(87) PCT Pub. No.: WO2007/122389
PCT Pub. Date: Nov. 1, 2007

(65) Prior Publication Data
US 2009/0161037 A1   Jun. 25, 2009

(30) Foreign Application Priority Data
Apr. 13, 2006   (GB) .................................. 0607573.3

(51) Int. Cl.
G02F 1/1335 (2006.01)
G09F 13/04 (2006.01)
G09F 13/08 (2006.01)
F21V 7/04 (2006.01)
C09K 19/00 (2006.01)

(52) U.S. Cl. ................ 349/62; 349/61; 349/65; 349/67; 349/69; 349/96; 362/97.1; 362/97.2; 362/600; 362/609; 428/1.31

(58) Field of Classification Search .................... 349/62, 349/61, 65, 67, 79, 96; 362/97.1, 97.2, 600, 362/609; 428/1.31
See application file for complete search history.

(56) References Cited

U.S. PATENT DOCUMENTS

| | | | |
|---|---|---|---|
| 2004/0142183 A1 * | 7/2004 | Lazarev et al. | 428/426 |
| 2004/0157122 A1 * | 8/2004 | Naoi et al. | 429/213 |
| 2005/0195340 A1 * | 9/2005 | Lazarev | 349/62 |

FOREIGN PATENT DOCUMENTS
WO   WO 2005051926 A1 *   6/2005
* cited by examiner

Primary Examiner — Brian M. Healy
Assistant Examiner — Jerry Blevins
(74) Attorney, Agent, or Firm — Houst Consulting

(57) ABSTRACT

The present invention relates generally to backlight modules for display devices and liquid crystal displays incorporating the same, and more particularly, to a backlight module for generating light with a single polarization state. The present invention provides a backlight module, comprising an optical cavity for reflecting and depolarizing light that is incident upon a front surface of said optical cavity and a multilayer polarizer comprising a plurality of layers. Said multilayer polarizer faces the front surface of the optical cavity and the layers are arranged in such a way that a light of polarization substantially parallel to the transmission axis of said multilayer polarizer is substantially transmitted and the light of substantially orthogonal polarization is substantially reflected by said multilayer polarizer in at least one predetermined wavelength subrange of the visible wavelength range. At least one of said layers comprises rod-like supramolecules forming at least partially a three-dimensional structure in the layer. The present invention also provides a liquid crystal display, comprising a liquid crystal cell, a front polarizer, and a backlight module according to the first aspect of the present invention. The multilayer polarizer of the backlight module faces the back panel and serves as a back polarizer of the liquid crystal display.

39 Claims, 12 Drawing Sheets

BACKLIGHT MODULE AND LIQUID CRYSTAL DISPLAY INCORPORATING THE SAME

This invention relates generally to backlight modules for display devices and liquid crystal displays incorporating the same.

Flat panel displays characterized by small thickness, low weight, and low power consumption find increasing use as displays in portable devices. Among flat panel displays of various types, liquid crystal display (LCD) devices are most widely used in laptop computers and desktop monitors because of their superior resolution, colour image, and display quality.

LCD devices use the optical anisotropy and polarization properties of liquid crystal molecules to produce a predetermined image. Liquid crystal molecules have a definite orientation, which depends on their particular characteristics. This orientation can be modified by an electric field applied across the axes of liquid crystal molecules. In other words, electric fields applied across the molecular axis can change the orientation of liquid crystal molecules. Due to optical anisotropy, incident light is refracted according to the orientation of liquid crystal molecules.

LCD devices comprise upper and lower substrates with electrodes, which are spaced apart and face each other, and a layer of liquid-crystalline substance confined between these substrates. When a voltage is applied to the liquid crystal layer with the aid of electrodes placed on each substrate, the direction of alignment of the liquid crystal molecules is changed in accordance with the applied voltage so as to display desired images. By controlling the applied voltage, it is possible to provide variable transmission of light beams in the LCD device to display data images.

LCD devices do not emit light by themselves, and only control the transmission of incident light. Therefore, each LCD device needs an additional light source. In particular, LCD devices often use light sources in the form of backlight modules. The backlight modules are classified into "direct backlight" (or simply "direct") and "edge backlight" (or simply "edge") types, according to the arrangement of a lamp (or lamps). When a backlight module of the direct type is used for a liquid crystal display device, light beams radiated by a lamp are directly incident upon the LCD panel. In the case when the edge type backlight module is used, light beams radiated by a lamp enter the LCD panel via a light guide or a reflector. Light guides are made of optically transparent materials transmitting light along their length by means of total internal reflection. Finally, the light beam is reflected from the back surface of the light guide toward the front surface at an angle, which allows it to exit from the front edge of the light guide. Various reflection mechanisms are used to distribute the light exiting the guide uniformly over the panel, including reflective dots, channels, facets, etc.

Backlight modules employing non-collimated light sources, such as fluorescent lamps, typically incorporate at least two reflectors. A lamp cavity reflector is used to reflect the light emitted in a direction away from the light guide back toward the guide. This reflector can be specular or diffuse, although specular reflectors are most frequently employed.

The second reflector is provided near the back surface of the light guide to reflect light from the back surface of the light guide and direct it toward the front surface of the light guide where it can be transmitted to the viewer (to the LCD device).

The main disadvantage of conventional reflectors used in the lamp cavity and at the back surface of the light guide is the relatively high optical absorption and high transmission of incident light. Typical reflectors absorb or transmit from about 4 to 15% of the incident light. This fraction of light is obviously not available to the viewer; thereby the absorption and/or transmission lead to degradation of the backlight module performance.

With advent of the information technology age, there is increasing demand for high-quality LCDs. High-quality imaging requires more effective utilization of the radiation emitted by light sources. Conventionally, for obtaining singly polarized light beam output from an LCD backlight module, a polarizing plate is arranged between the LCD device and the backlight module in order to inhibit the passage of light beams with undesired polarization. In practice, the intensity of the resultant light beam with a single polarization state is less than half of the original light beam in terms of illuminance.

In a first aspect, the present invention provides a backlight module, comprising an optical cavity for reflecting and depolarizing light that is incident upon a front surface of said optical cavity and a multilayer polarizer. Said multilayer polarizer comprises a plurality of layers. It faces the front surface of the optical cavity and the layers are arranged in such a way that the light of polarization substantially parallel to the transmission axis of said multilayer polarizer is substantially transmitted and the light of substantially orthogonal polarization is substantially reflected by said multilayer polarizer in at least one predetermined wavelength subrange of the visible wavelength range. At least one of said layers comprises rod-like supramolecules forming at least partially a three-dimensional structure in the layer.

In a second aspect, the present invention provides a liquid crystal display, comprising a liquid crystal cell, a front polarizer, and a backlight module according to the first aspect of the present invention. Said liquid crystal cell comprises a front panel comprising functional layers, a liquid crystal layer, and a back panel comprising functional layers. Said front polarizer faces the front panel. The multilayer polarizer of the backlight module faces the back panel and serves as a back polarizer of the liquid crystal display.

The general description of the present invention having been made, a further understanding can be obtained by reference to the specific preferred embodiments, which are given herein only for the purpose of illustration and are not intended to limit the scope of the appended claims.

The present invention provides a backlight module, comprising an optical cavity reflecting and depolarizing light that is incident upon a front surface of said optical cavity and a multilayer polarizer. Said multilayer polarizer comprises a plurality of layers. It faces the front surface of the optical cavity and the layers are arranged in such a way that the light of polarization substantially parallel to the transmission axis of said multilayer polarizer is substantially transmitted and the light of substantially orthogonal polarization is substantially reflected by said multilayer polarizer in at least one predetermined wavelength subrange of the visible wavelength range. At least one of said layers comprises rod-like supramolecules forming at least partially a three-dimensional structure in the layer.

The supramolecule is an association of flat π-conjugated molecules in a stack with the number of molecules in association defined by conditions of formation such as temperature, pressure, additives and so forth and not being precisely and definitively controlled by the molecules' structure or the composition of functional groups.

In a preferred embodiment of the present invention, the rod-like supramolecules comprise at least one polycyclic organic compound with a conjugated π-system and functional groups which are capable of forming non-covalent bonds between said supramolecules. Functional groups of one molecule are designed in such a way that they may interact with each other with formation of inter-stack non-covalent bonding, forming a fully saturated three dimensional network of non-covalent bonds. The plurality of layers can be transparent for electromagnetic radiation only in a part of the visible wavelength range, rather than in the entire range, and this part of said wavelength band will be called a subrange. This subrange can be determined experimentally for each polycyclic organic compound with a conjugated π-system and functional groups.

In another preferred embodiment of the present invention, the at least one organic compound is heterocyclic. In yet another preferred embodiment of the present invention, at least one of said layers is water non-soluble. The combination of functional groups of one molecule is designed in such a way that the network of non-covalent bonds inhibits inclusion of water in the three-dimensional structure of the crystalline structure of molecules being parts of supramolecules.

In another preferred embodiment of the present invention, at least one of said layers is optically biaxial. In another preferred embodiment of the present invention, the rod-like supramolecules are oriented substantially parallel or perpendicular to the front surface of the optical cavity. In still another preferred embodiment of the present invention, at least one of the non-covalent bonds is an H-bond. In yet another preferred embodiment of the present invention, at least one of the non-covalent bonds is a coordination bond.

In one embodiment of the backlight module, the organic compound has the general structural formula I

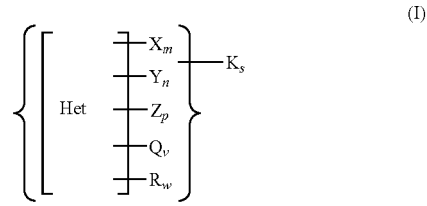

where Het is an at least partially conjugated substantially planar heterocyclic molecular system; X is a carboxylic group —COOH; m is 0, 1, 2, 3 or 4; Y is a sulfonic group —SO$_3$H; n is 0, 1, 2, 3 or 4; Z is an amide of a carboxylic acid group; p is 0, 1, 2, 3 or 4; Q is an amide of a sulfonic acid group; v is 0, 1, 2, 3 or 4; K is a counterion; s is the number of counterions providing neutral state of the molecule; R is a substituent selected from the list comprising CH$_3$, C$_2$H$_5$, NO$_2$, Cl, Br, F, CF$_3$, CN, OH, OCH$_3$, OC$_2$H$_5$, OCOCH$_3$, OCN, SCN, NH$_2$, and NHCOCH$_3$; w is 0, 1, 2, 3 or 4; and if the integer m is equal to 0, then both n and p are not equal to 0, and if the integer n is equal to 0, then the integer m is equal to or greater than 1. Preferably, K is selected from the list comprising the following ions: H$^+$, NH$_4^+$, Na$^+$, K$^+$, Li$^+$, Ba$^{++}$, Ca$^{++}$, Mg$^{++}$, Sr$^{++}$, Zn$^{++}$. The monovalent counterions (H$^+$, NH$_4^+$, Na+, K+, Li+) are used for providing an electrical neutrality of the organic compounds. The polyvalent counterions (Ba$^{++}$, Ca$^{++}$, Mg$^{++}$, Sr$^{++}$, Zn$^{++}$) are used for stabilization of the organic compounds and provide their insolubility.

In one embodiment of the backlight module, the Het is substantially transparent in the visible spectral range. In the present invention it is supposed that the visible range has a lower boundary that is approximately equal to 400 nm and an upper boundary that is approximately equal to 700 nm. The examples of the at least partially conjugated heterocyclic molecular system are presented but not limited to the exemplary general structural formulas II-XLII as given in Table 1:

TABLE 1

Examples of at least partially conjugated substantially planar heterocyclic molecular systems (Het) which are substantially transparent in the visible spectral range

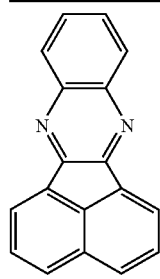

(II)

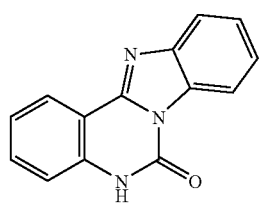

(III)

TABLE 1-continued
Examples of at least partially conjugated substantially planar heterocyclic molecular systems
(Het) which are substantially transparent in the visible spectral range
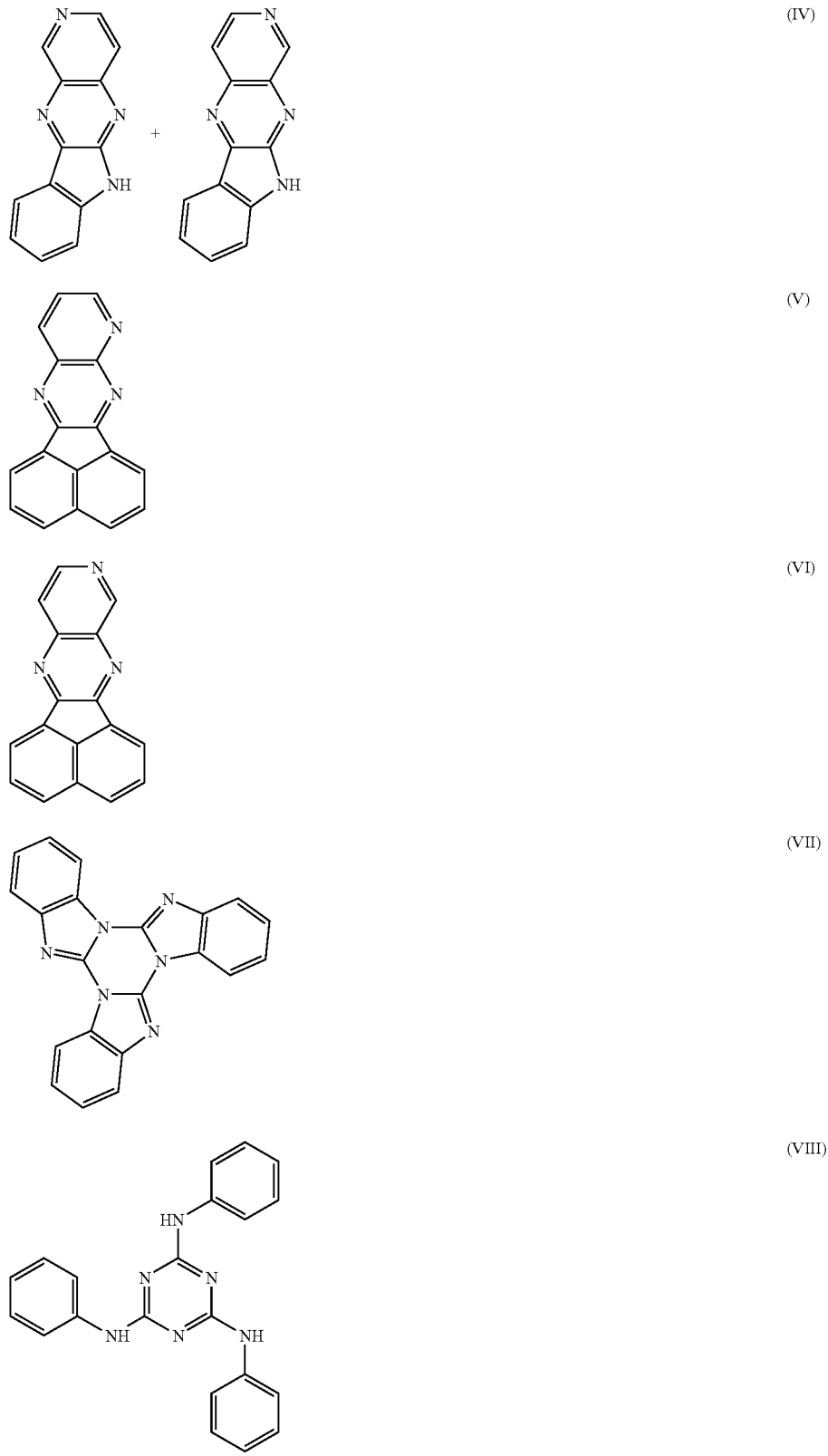
(IV)
(V)
(VI)
(VII)
(VIII)

TABLE 1-continued
Examples of at least partially conjugated substantially planar heterocyclic molecular systems (Het) which are substantially transparent in the visible spectral range
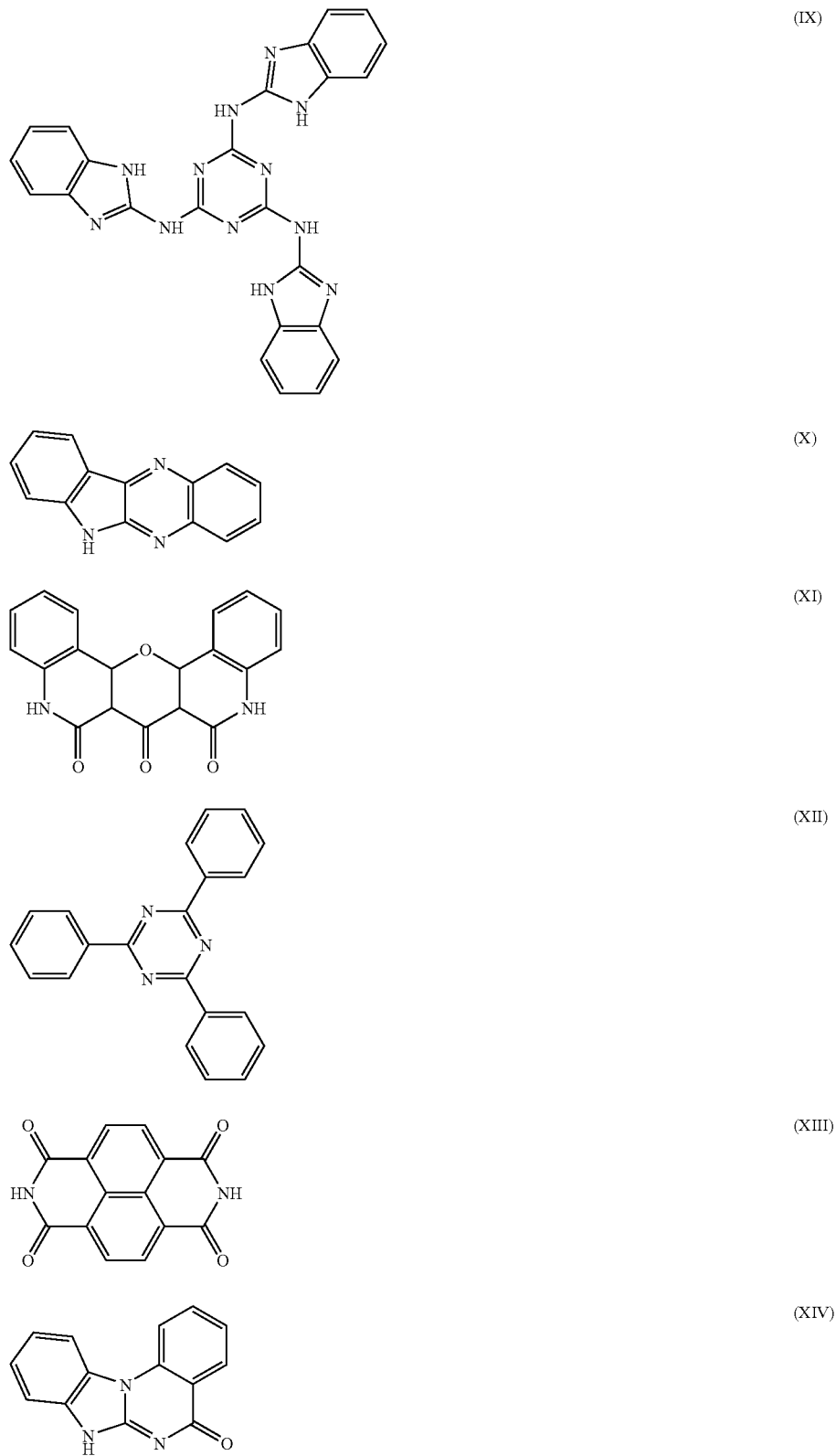
(IX)
(X)
(XI)
(XII)
(XIII)
(XIV)

TABLE 1-continued
Examples of at least partially conjugated substantially planar heterocyclic molecular systems (Het) which are substantially transparent in the visible spectral range
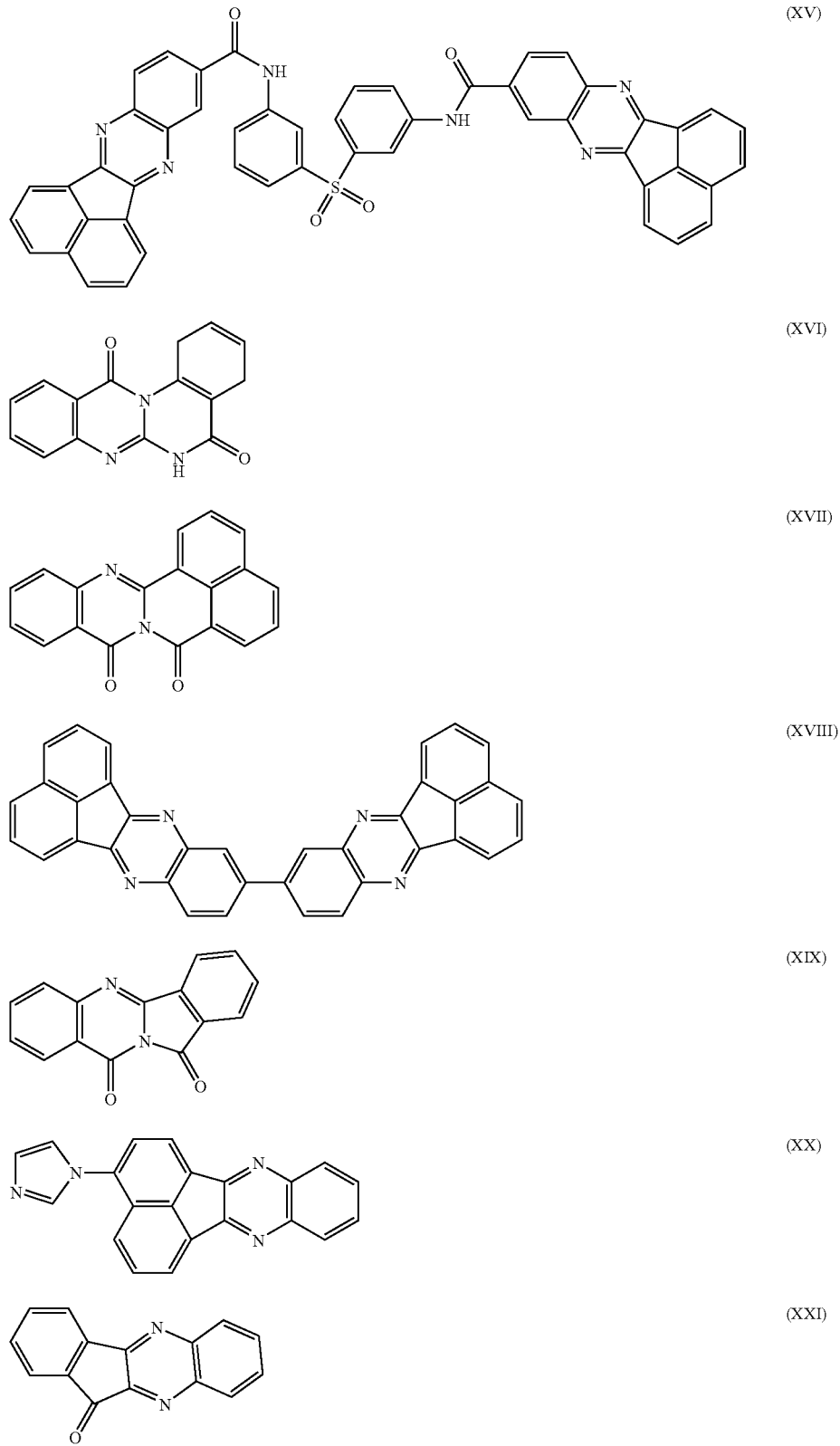
(XV)
(XVI)
(XVII)
(XVIII)
(XIX)
(XX)
(XXI)

TABLE 1-continued
Examples of at least partially conjugated substantially planar heterocyclic molecular systems (Het) which are substantially transparent in the visible spectral range
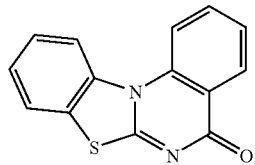 (XXII)
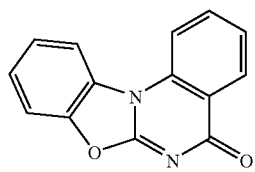 (XXIII)
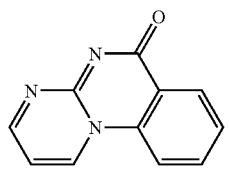 (XXIV)
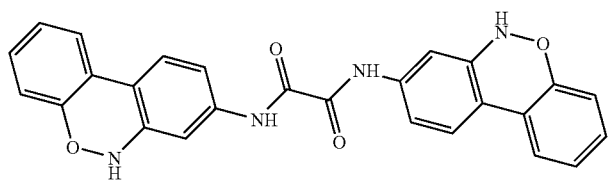 (XXV)
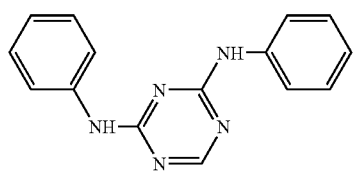 (XXVI)
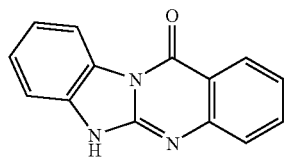 (XXVII)
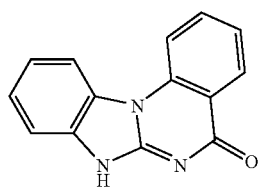 (XXVIII)

TABLE 1-continued
Examples of at least partially conjugated substantially planar heterocyclic molecular systems (Het) which are substantially transparent in the visible spectral range
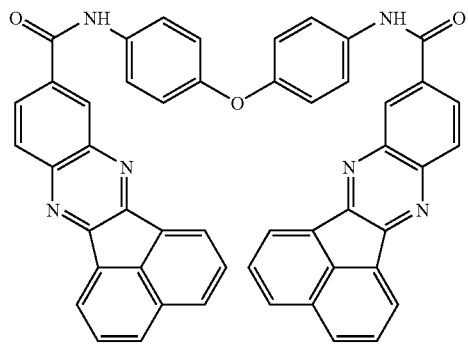 (XXIX)
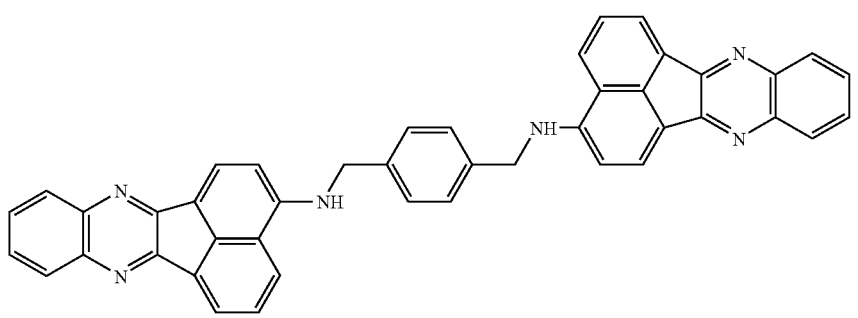 (XXX)
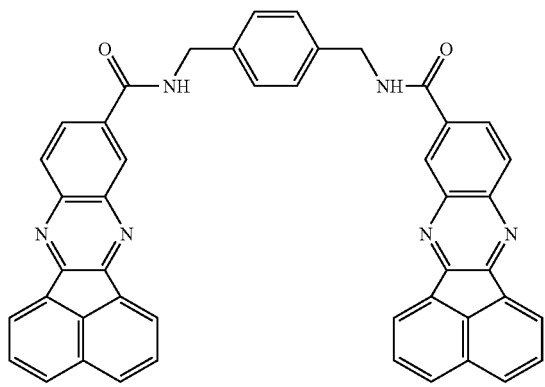 (XXXI)
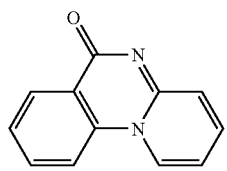 (XXXII)
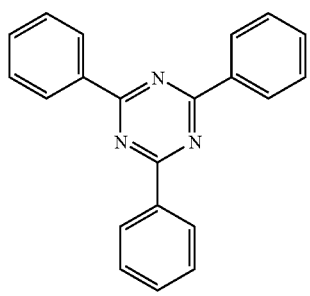 (XXXIII)

TABLE 1-continued
Examples of at least partially conjugated substantially planar heterocyclic molecular systems (Het) which are substantially transparent in the visible spectral range
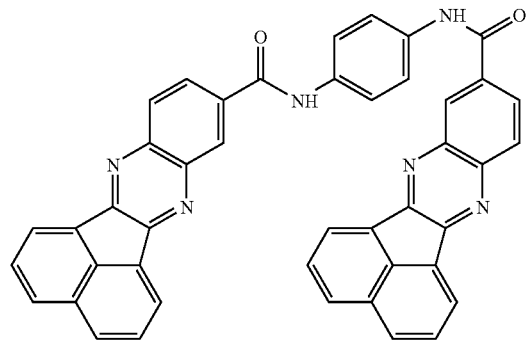
(XXXIV)
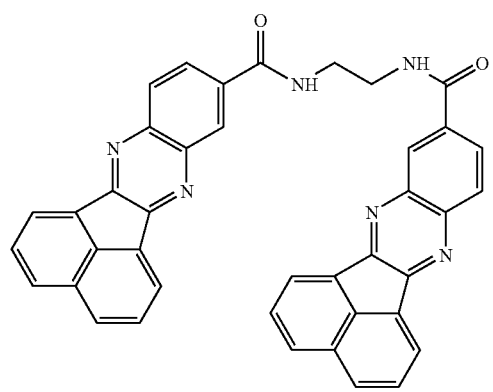
(XXXV)
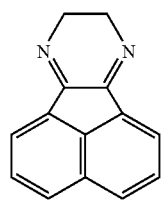
(XXXVI)
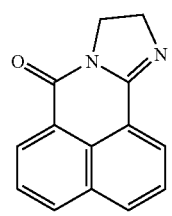
(XXXVII)
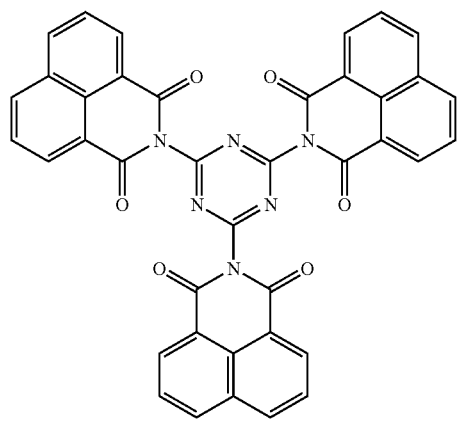
(XXXVIII)

TABLE 1-continued
Examples of at least partially conjugated substantially planar heterocyclic molecular systems (Het) which are substantially transparent in the visible spectral range
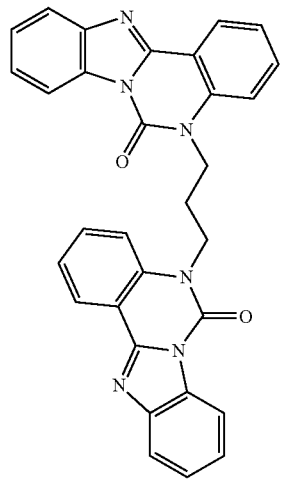
(XXXIX)
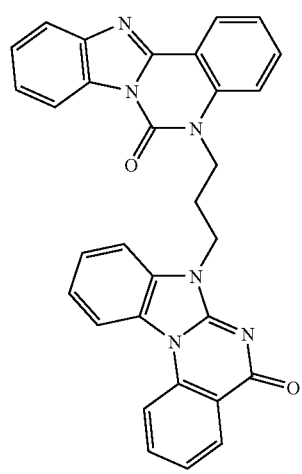
(XL)
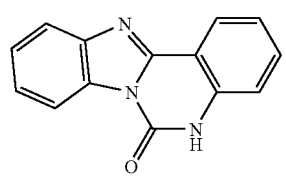
(XLI)
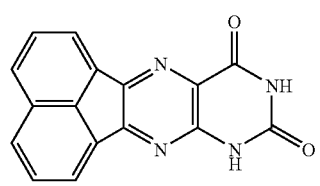
(XLII)

In one preferred embodiment of the disclosed backlight module, the organic compound is an acenaphthoquinoxaline derivative. Examples of the acenaphthoquinoxaline sulfonamide derivatives containing at least one carboxylic group (wherein m is equal to 1, 2, 3 or 4) and having general structural formulas corresponding to structures 1-7 are given in Table 2.

TABLE 2

Examples of acenaphthoquinoxaline sulfonamide derivatives containing carboxylic groups

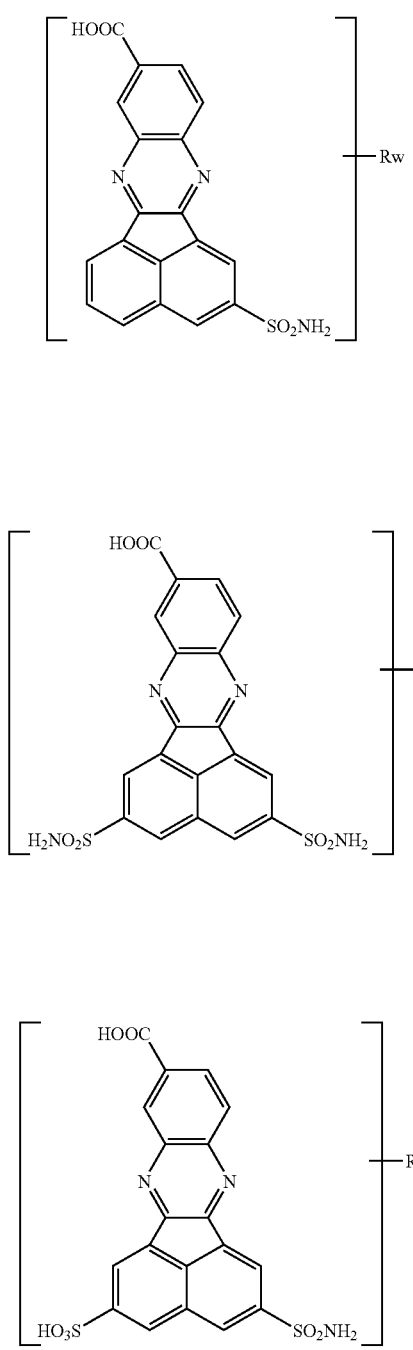

TABLE 2-continued

Examples of acenaphthoquinoxaline sulfonamide derivatives containing carboxylic groups (4)
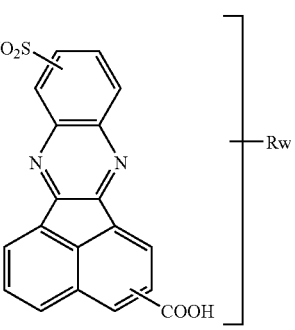

(5)
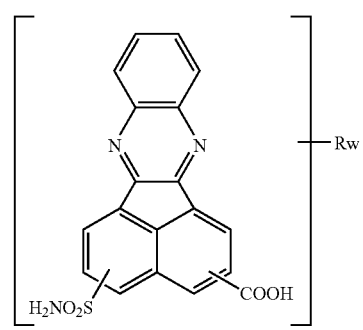

(6)
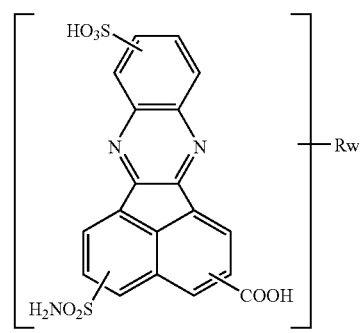

(7)
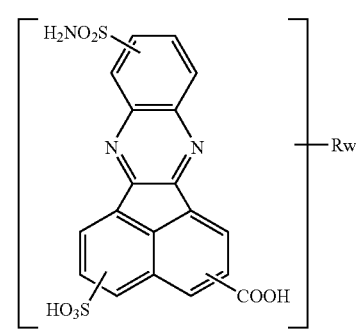

In another embodiment of the disclosed backlight module the organic compound comprises at least one sulfonic group, wherein n is equal to 1, 2, 3 or 4. Examples of the acenaphthoquinoxaline sulfonamide derivative containing one or two sulfonic groups and having general structural formulas corresponding to structures 8-19 are given in Table 3.

TABLE 3
Examples of acenaphthoquinoxaline sulfonamide derivatives containing sulfonic groups
(8)
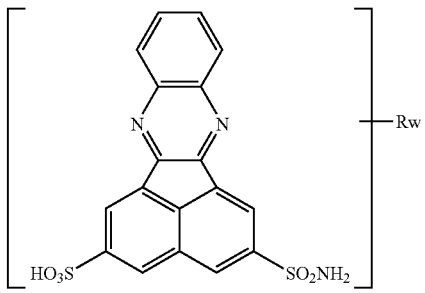
(9)
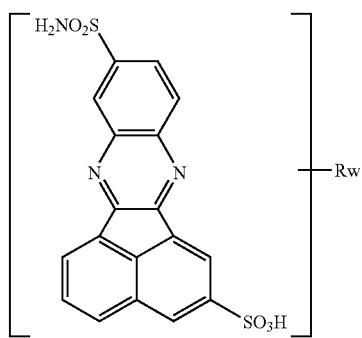
(10)
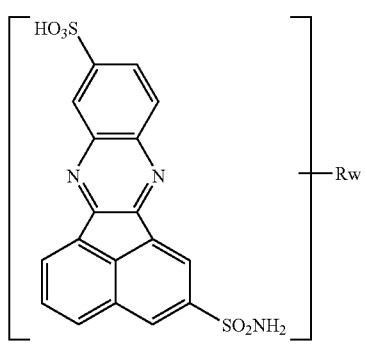
(11)
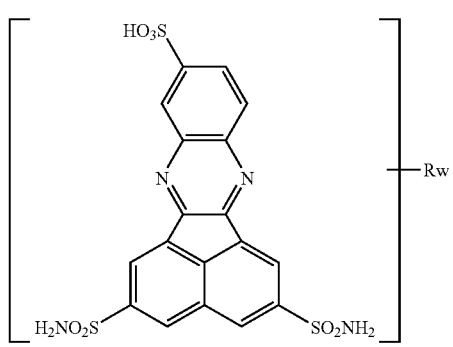
TABLE 3-continued
Examples of acenaphthoquinoxaline sulfonamide derivatives containing sulfonic groups
(12)
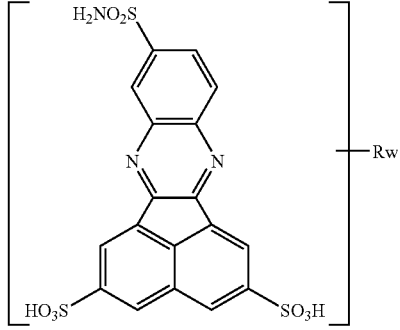
(13)
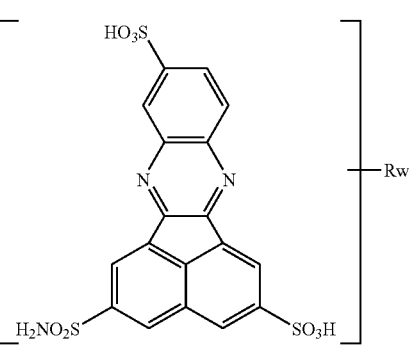
(14)
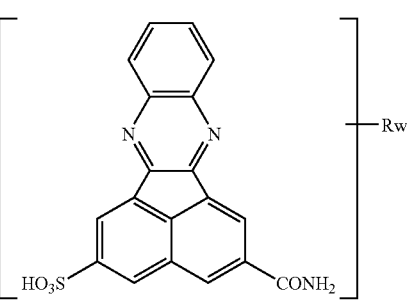
(15)
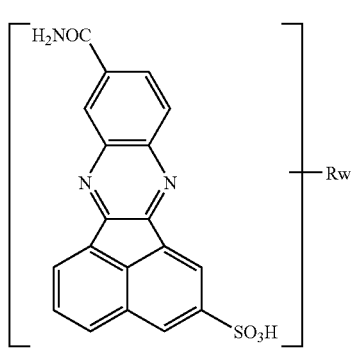

TABLE 3-continued

Examples of acenaphthoquinoxaline sulfonamide derivatives containing sulfonic groups

(16)
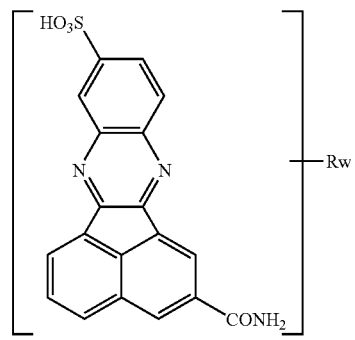

(17)
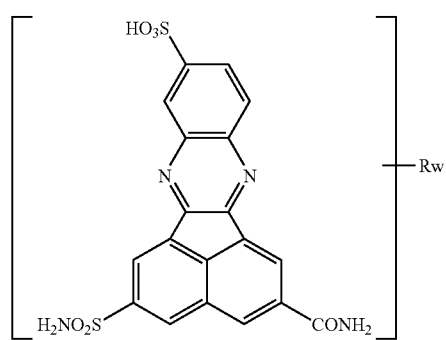

(18)
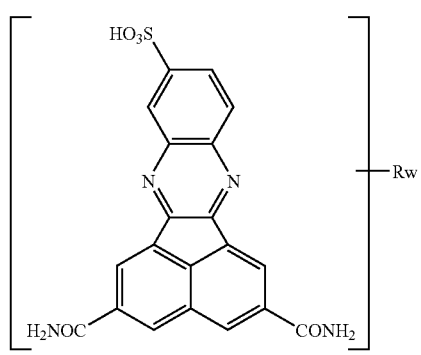

(19)
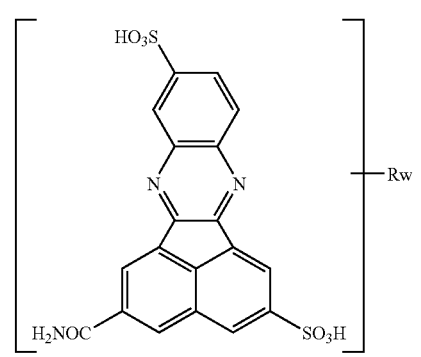

In another preferred embodiment of the backlight module, the organic compound is a 6,7-dihydrobenzimidazo[1,2-c] quinazolin-6-one derivative. The derivative may comprise at least one carboxylic group or at least one acid amide group as the functional group. In those embodiments wherein the derivative comprises at least one carboxylic group, the integer m may be 1, 2, 3 or 4.

Examples of 6,7-dihydrobenzimidazo[1,2-c]quinazolin-6-one derivatives comprising one or two carboxylic groups —COOH, wherein said derivative has a general structural formula from the group comprising structures 20 to 32, are given in Table 4.

TABLE 4

Examples of 6,7-dihydrobenzimidazo[1,2-c]quinazolin-6-one derivatives containing carboxylic groups

(20)
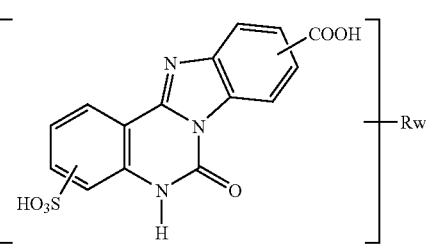

(21)
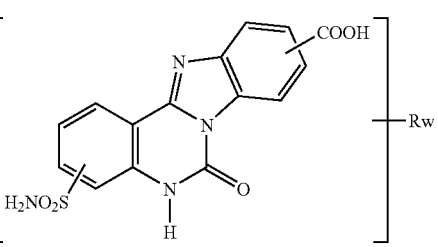

(22)
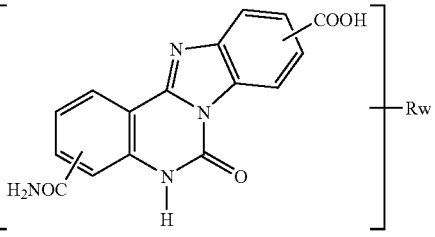

(23)
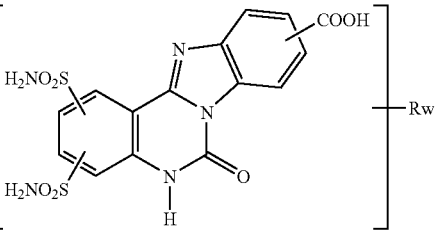

(24)
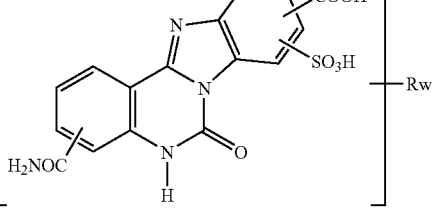

TABLE 4-continued

Examples of 6,7-dihydrobenzimidazo[1,2-c]quinazolin-6-one derivatives containing carboxylic groups

(25)
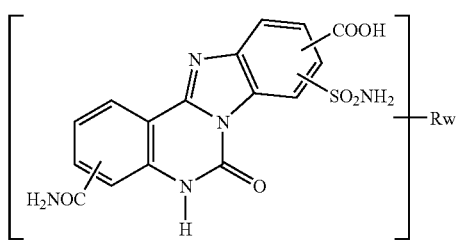

(26)
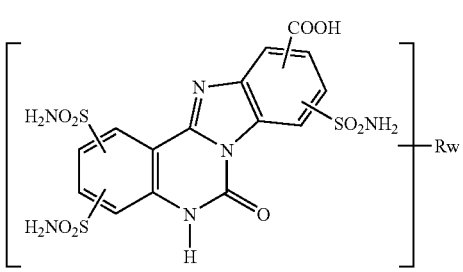

(27)
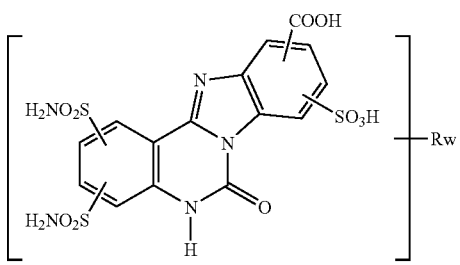

(28)
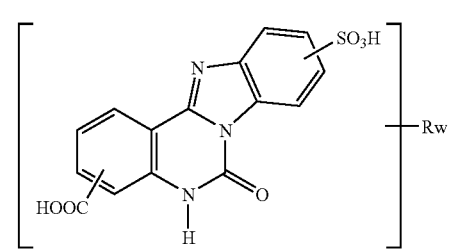

(29)
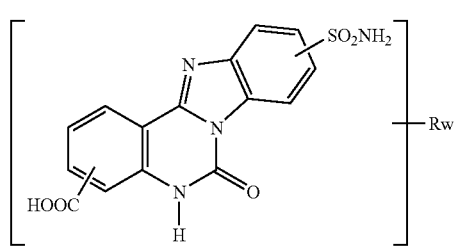

TABLE 4-continued

Examples of 6,7-dihydrobenzimidazo[1,2-c]quinazolin-6-one derivatives containing carboxylic groups

(30)
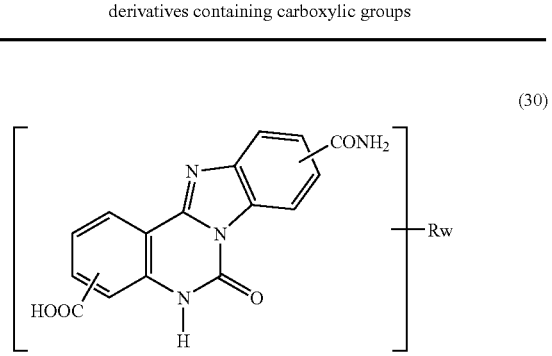

(31)
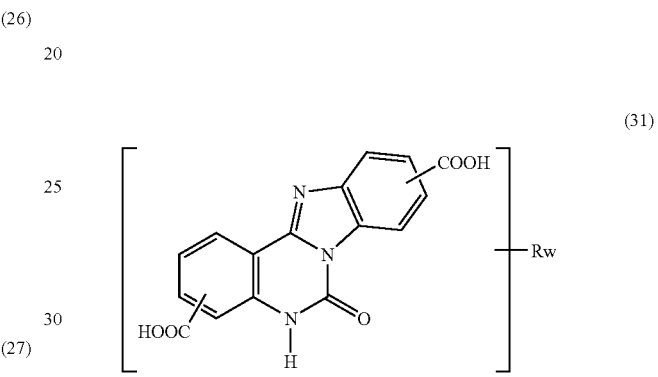

(32)
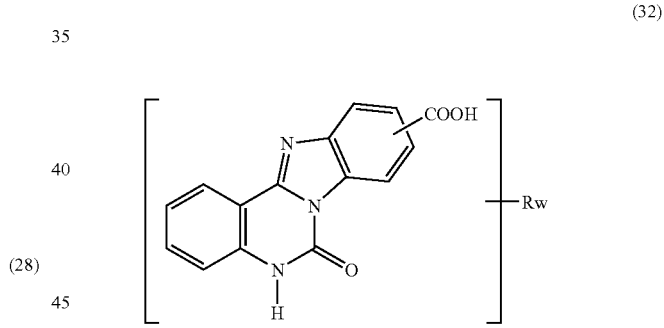

In those embodiments wherein the 6,7-dihydrobenzimidazo[1,2-c]quinazolin-6-one derivative comprises at least one acid amide group, the at least one acid amide group can be a carboxyamide group ($CONH_2$). In other preferred embodiments wherein the 6,7-dihydrobenzimidazo[1,2-c]quinazolin-6-one derivative comprises at least one acid amide group, the at least one acid amide group can be a sulfonamide group ($SO_2NH_2$).

In another preferred embodiment of the disclosed backlight module, the 6,7-dihydrobenzimidazo[1,2-c]quinazolin-6-one derivative comprises at least one sulfonic group —$SO_3H$. In those embodiments wherein the derivative comprises at least one sulfonic group, the integer n may be 1, 2, 3 or 4. Examples of 6,7-dihydrobenzimidazo[1,2-c]quinazolin-6-one derivatives comprising sulfonic groups —$SO_3H$, wherein said derivative has a general structural formula from the list comprising structures 33 to 41, are given in Table 5.

TABLE 5

Example of 6,7-dihydrobenzimidazo[1,2-c]quinazolin-6-one derivatives containing sulfonic groups

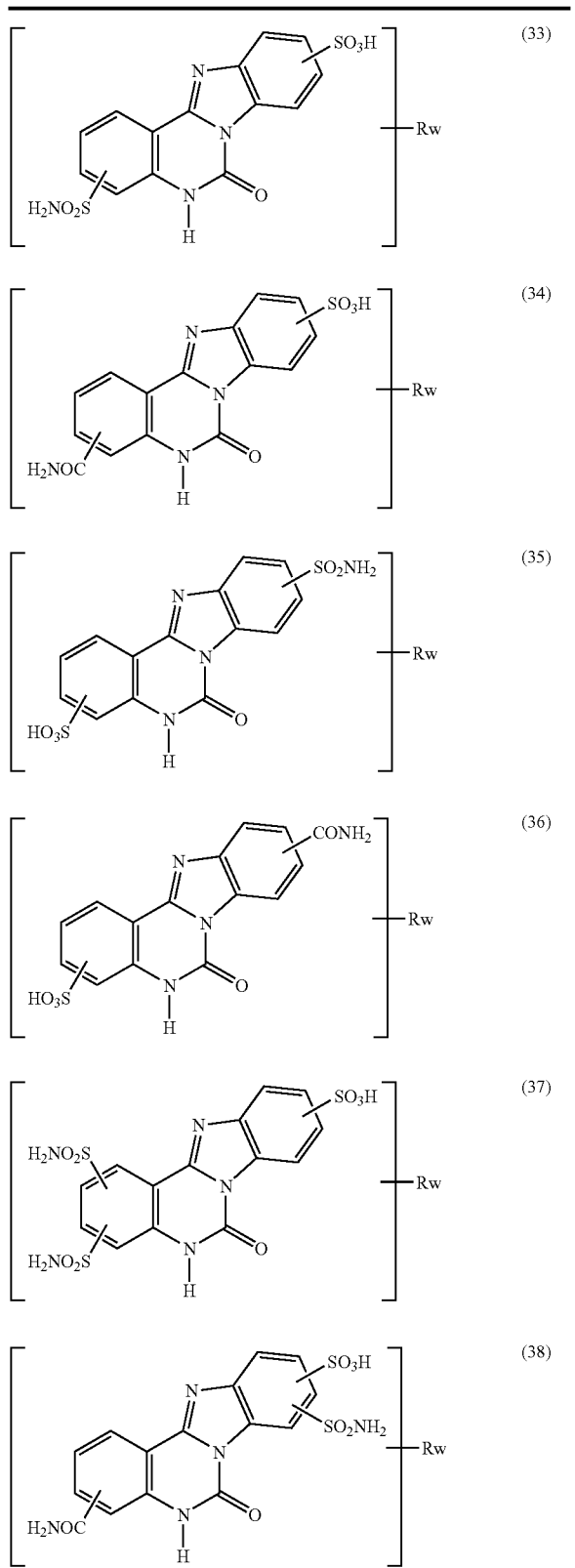

TABLE 5-continued

Example of 6,7-dihydrobenzimidazo[1,2-c]quinazolin-6-one derivatives containing sulfonic groups

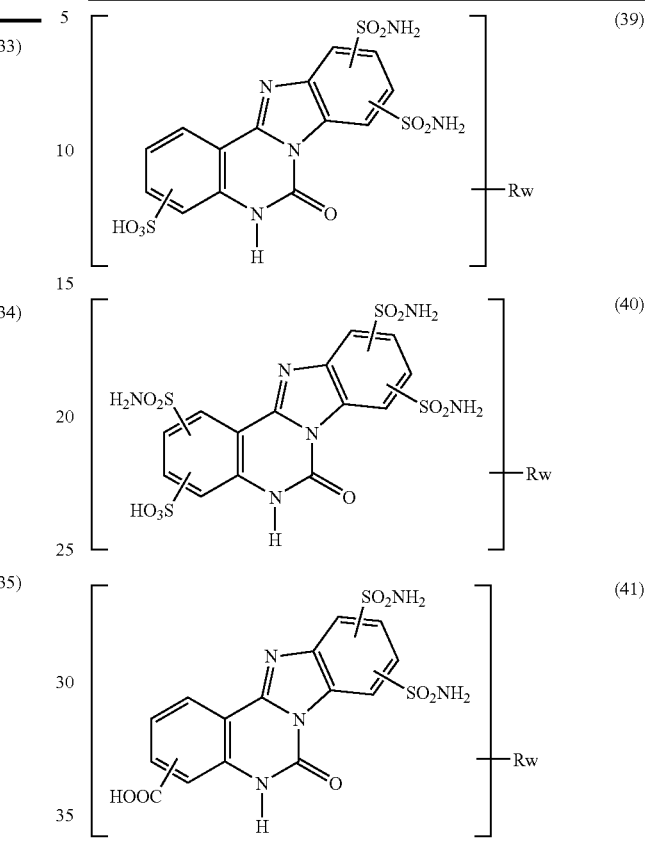

In one preferred embodiment of the disclosed invention, said plurality of layers comprises alternated optically biaxial and isotropic layers. In another preferred embodiment of the present invention, at least one isotropic layer comprises at least two sublayers made of materials having different indices of refraction. In still another preferred embodiment of the present invention, the multilayer polarizer is capable of polarizing light in the entire range of incident angles. In yet another preferred embodiment of the present invention, the total thickness of the plurality of layers does not exceed approximately 5 micrometers, wherein the thickness of each layer is approximately equal to a quarter-wave. In another preferred embodiment of the present invention, the total thickness of the plurality of layers does not exceed approximately 3 micrometers, wherein the thickness of each layer is approximately equal to a quarter-wave. In another embodiment of the present invention, the number of layers in the plurality of layers does not exceed 20. In another preferred embodiment of the present invention, the number of layers does not exceed 10. In still another preferred embodiment of the present invention, the number of layers does not exceed 5.

In one embodiment of the present invention, the rod-like supramolecules comprise two or more of said polycyclic organic compounds.

In one embodiment of the disclosed backlight module, at least one layer of the multilayer polarizer is made of a fluorescent material which is capable of converting ultraviolet radiation into visible light. In another embodiment of the disclosed backlight module, at least one layer of the multilayer polarizer has a fundamental absorption edge below 400 nm. In another embodiment of the disclosed backlight module, the multilayer polarizer has a transmission coefficient of not less than 0.98. In still another embodiment of the disclosed backlight module, at least one layer of the multilayer polarizer is uniformly transparent in the visible spectral range.

In one embodiment of the disclosed backlight module, the optical cavity comprises a rear plate with a ridged rear surface facing the front surface of the optical cavity, a reflective retardation film deposited onto the ridged rear surface of said rear plate, a two-sided electroluminescent panel (which serves as a light source) situated opposite the rear plate, and a transparent substrate situated on said two-sided electroluminescent panel and having side surfaces. In one embodiment the backlight module further comprises reflective films deposited onto said side surfaces of said substrate.

In still another embodiment of the disclosed backlight module, the optical cavity comprises a scattering structure having a front surface facing the front surface of the optical cavity and a rear surface, a reflective film disposed onto a rear surface of the scattering structure, and a two-sided electroluminescent panel facing the front surface of the scattering structure.

In another embodiment of the disclosed backlight module, the optical cavity comprises a scattering structure having a front surface facing the front surface of the optical cavity and a rear surface, a substrate situated on a front surface of the scattering structure, and a one-sided electroluminescent panel situated on the rear surface of the scattering structure. In still another embodiment, the backlight module includes a two-sided electroluminescent panel comprising an illuminating layer, an insulating layer, and two transparent electrodes. The illuminating layer and insulating layer are adjacent and situated between said transparent electrodes. In one embodiment of the disclosed invention, the backlight module further comprises reflective films disposed onto side surfaces of the substrate. In yet another embodiment, the backlight module comprises an undulated film disposed on the multilayer polarizer for controlling the output angle and diffusion angle of light beams.

In another embodiment of the disclosed backlight module, the optical cavity further comprises (i) a light guide having a front surface facing the front surface of the optical cavity, a rear surface, and an edge, (ii) a light source optically connected to the edge of the light guide for emitting light into the light guide, (iii) a retardation film located above the front surface of the light guide, and (iv) a rear reflector proximate the rear surface of the light guide, which comprises a reflective film which reflects at least about 80% of normal incident light and at least about 80% of light incident at an angle of 60° relative to the normal.

The present invention also provides a liquid crystal display, comprising a liquid crystal cell, a front polarizer, and a backlight module according to the first aspect of the present invention. Said liquid crystal cell comprises a front panel comprising functional layers, a liquid crystal layer, and a back panel comprising functional layers. Said front polarizer faces the front panel. The multilayer polarizer of the backlight module faces the back panel and serves as a back polarizer of the liquid crystal display. In one embodiment of the invention, the disclosed liquid crystal display further comprises an anti-reflective coating located on the front polarizer. In another embodiment of the invention, the disclosed liquid crystal display further comprises a polarizer located between the back panel and the backlight module, and having a transmission axis substantially parallel to the transmission axis of the multilayer polarizer.

In still another embodiment of the disclosed liquid crystal display, the functional layers of the front panel comprise at least one layer selected from the group consisting of an electrode layer, an alignment layer, a planarization layer, a retarder layer a light-reflecting layer a colour filter layer a protective layer a layer simultaneously functioning as at least two of the above listed layers and combinations thereof. In a further embodiment of the disclosed liquid crystal display, the functional layers of the back panel comprise at least one layer selected from the group consisting of an electrode layer, an alignment layer, a planarization layer, a retarder layer, a light-reflecting layer, a colour filter layer, a protective layer, a layer simultaneously functioning as at least two of the above listed layers and combinations thereof. In a yet further embodiment of the disclosed liquid crystal display, the at least one electrode layer, when present, is made from ITO. In yet another embodiment of the disclosed liquid crystal display, the at least one protective layer is conducting. In a possible embodiment of the disclosed liquid crystal display according, at least one protective layer is made of silicon oxide and/or oxide(s) of heavy metal(s) or polymer(s).

In one embodiment of the invention, the liquid crystal display comprises the liquid crystal cell of a vertical alignment mode. In another embodiment of the invention, the liquid crystal display comprises the liquid crystal cell of an in-plane switching mode. In still another embodiment of the invention, the liquid crystal display comprises the liquid crystal cell of a super-twisted mode. In one embodiment of the invention, the liquid crystal display comprises the liquid crystal cell of a twisted mode.

Other objects and advantages of the present invention will become apparent upon reading the appended claims provided below, and upon reference to the drawings, in which:

FIGS. 9-12 show the simulated reflectance spectrum of a multilayer polarizer representing the case where the difference between high and low refractive indices in the plane of polarization is fixed at some value between 0.3 and 1.0. The polarizer reflectance is shown as a function of the wavelength for a structure of one quarter-wave cavity containing 2, 3, 4, and 5 H-layers.

Figure 9:
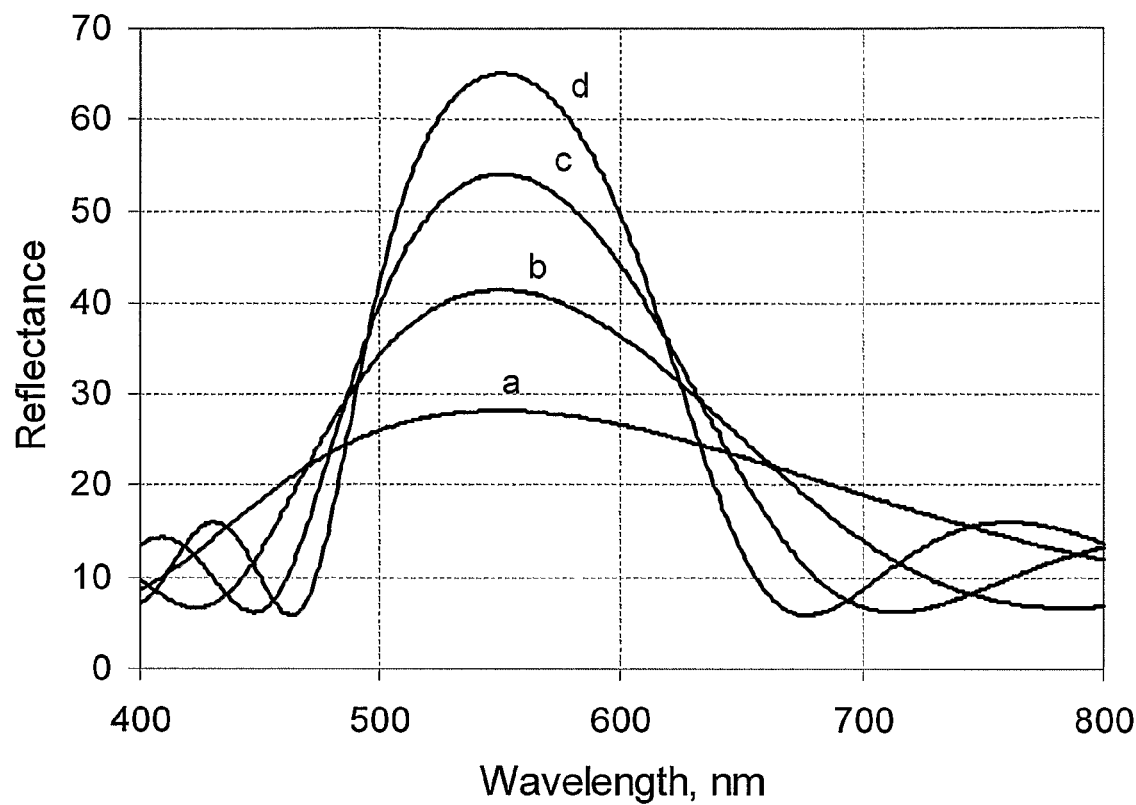

FIG. 9 shows the simulated reflectance spectrum, wherein the high index is fixed at 1.8 and the low index at 1.5, the substrate refractive index is 1.52.

Figure 10:
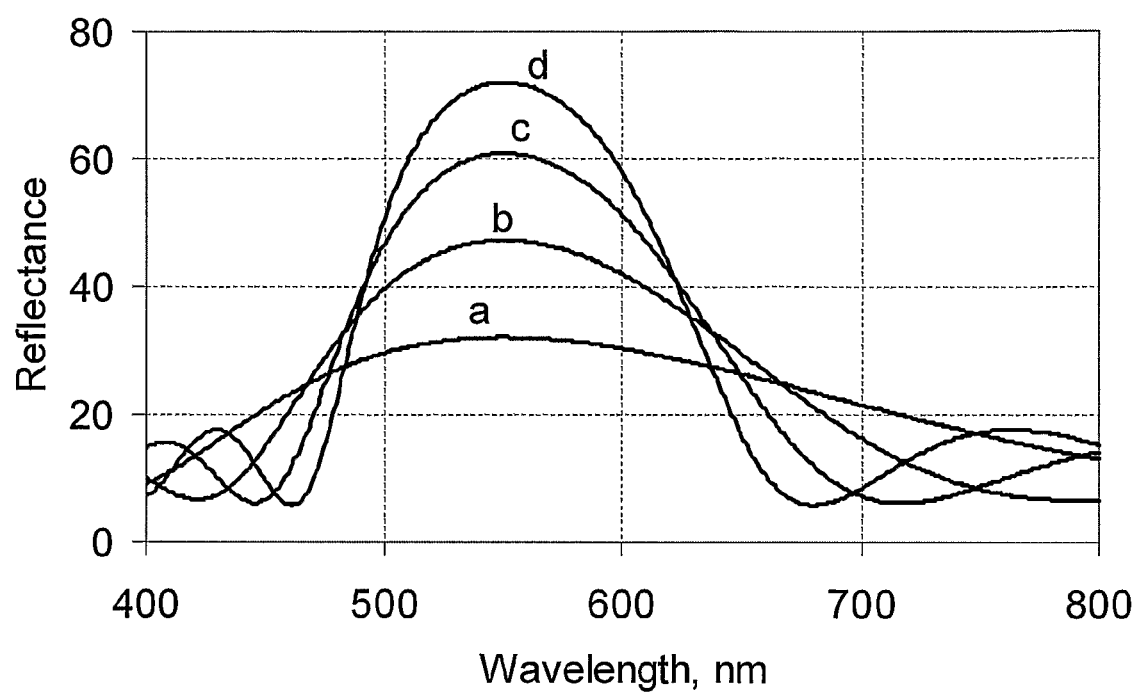

FIG. 10 shows the simulated reflectance spectrum, wherein the high index is fixed at 1.85 and the low index at 1.5, the refractive index of the substrate is 1.52.

Figure 11:
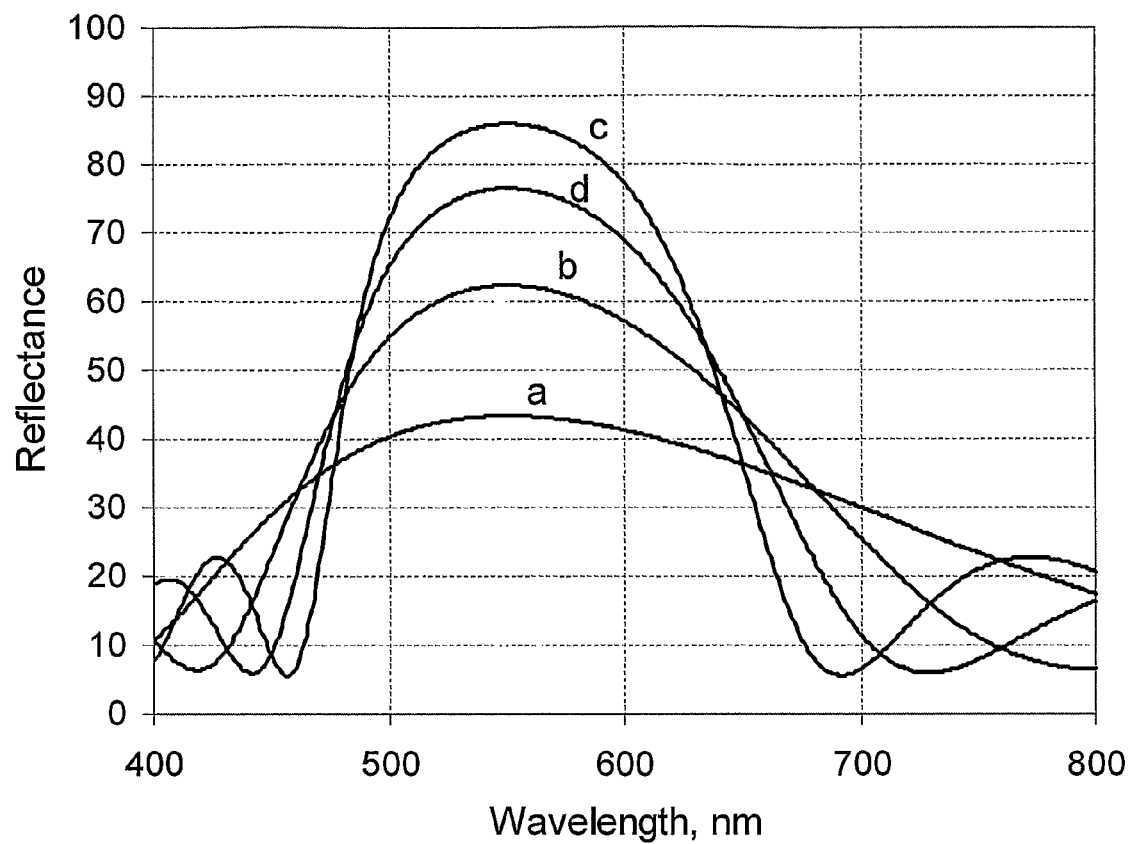

FIG. 11 shows the simulated reflectance spectrum, wherein the high index is fixed at 2.0 and the low index at 1.5, the refractive index of the substrate is 1.52.

Figure 12:
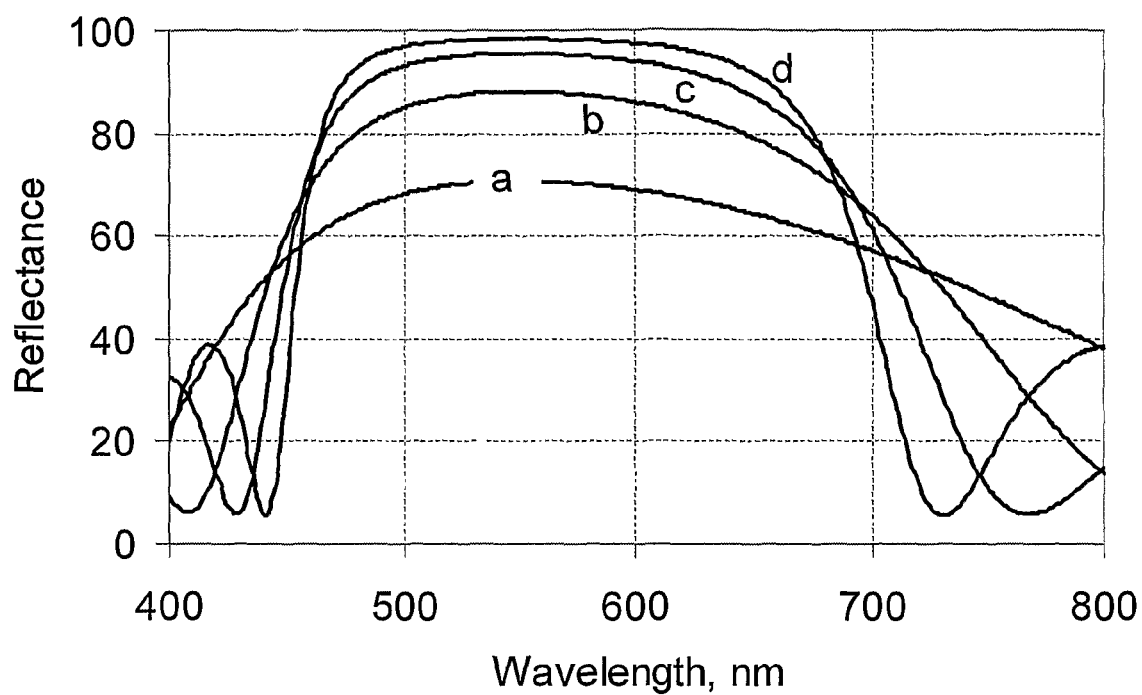

FIG. 12 shows the simulated reflectance spectrum, wherein the high index is fixed at 2.5 and the low index at 1.5, the refractive index of the substrate is 1.52.

Figure 1:
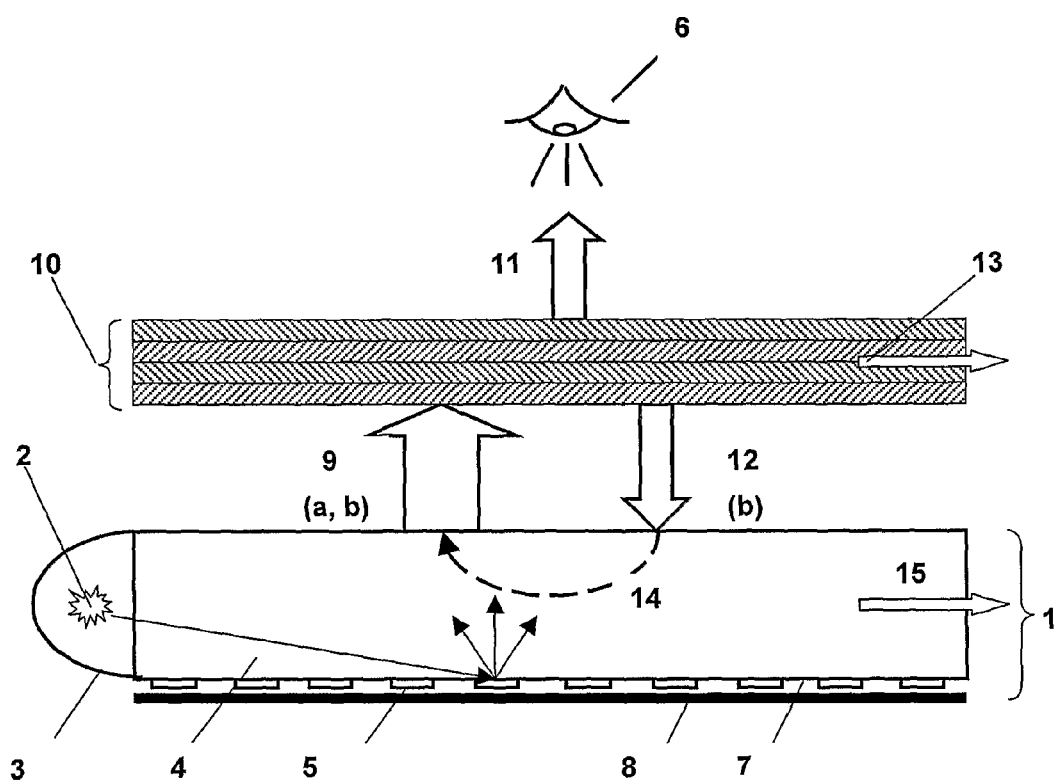
FIG. 1 shows a cross section of a backlight module according to one embodiment of the present invention.

FIG. 1 shows a cross section of a backlight module according to one embodiment of the present invention. In this embodiment, the optical cavity 1 of the edge backlight type includes a light source 2 semi-surrounded by a lamp cavity reflector 3. Light source 2 can be of any type, for example, a fluorescent lamp, incandescent lamp, solid-state source, electroluminescent (EL) device, etc. Although the embodiments described below typically include one such source, it will be understood that a backlight system according to the present invention could include two or more sources located at the same or different positions and combined so as to provide the required amount of light. In the preferred embodiments, the light source 2 comprises a source emitting light having randomized polarization. The light from light source 2 is coupled to the light guide 4 where it propagates until it encounters a diffuse-reflecting structure such as spots 5. The light guide 4 has an edge facing the light source and a front surface facing the multilayer polarizer. A discontinuous array of spots is arranged so as to extract the light and direct it toward observer 6. Mechanisms used to extract light from light guide 4 are not limited by using diffuse-reflecting spots on the rear surface 7 of the light guide, and any other suitable mechanism could be used. Examples of extraction mechanisms include (but are not limited to) the formation of channels on the back surface 7, discontinuities associated with a pseudo-wedge light guide 4 and increased reflection angles within this wedge-shaped light guide, and posts connecting a reflector to the guide and ensuring diffuse light scattering within the guide. Ambient light entering the optical cavity 1 may strike a spot or it may escape from the light guide through the interstitial areas between spots. A mirror layer 8 is situated below the light guide 4 to intercept and reflect back such light beams. The mirror layer may be diffuse-reflecting. In the general case, all the light beams that emerge from the optical cavity 1 are depicted by arrow 9. These beams are incident onto a multilayer polarizer 10 which transmits the light having the first polarization state (a) and effectively reflects light having the orthogonal polarization state (b). Consequently, a certain amount of light depicted by arrow 11 will be transmitted by multilayer polarizer 10, while a substantial amount of the remaining light will be reflected back as indicated by arrow 12. The preferred multilayer polarizer material is highly effective and the total losses due to absorption within multilayer polarizer 10 are very low (on the order of 1%). This loss is indicated by arrow 13. The light with the polarization state (b) reflected by multilayer polarizer 10 re-enters the optical cavity 1 where it strikes a diffuse-reflecting structure such as spots 5 or mirror layer 8. The diffuse-reflecting surfaces randomize the polarization state of the light reflected by optical cavity 1. This recirculation and randomization process is depicted as path 14. Optical cavity 1 is not a perfect reflector: optical losses in the cavity due to scattering and absorption are depicted by arrow 15. These losses are also low. Multiple recirculations effected by the combination of optical cavity 1 and multilayer polarizer 10 provide an effective mechanism for converting light from the polarization state (b) to state (a) for ultimate transmission to the observer 6.

Figure 2:
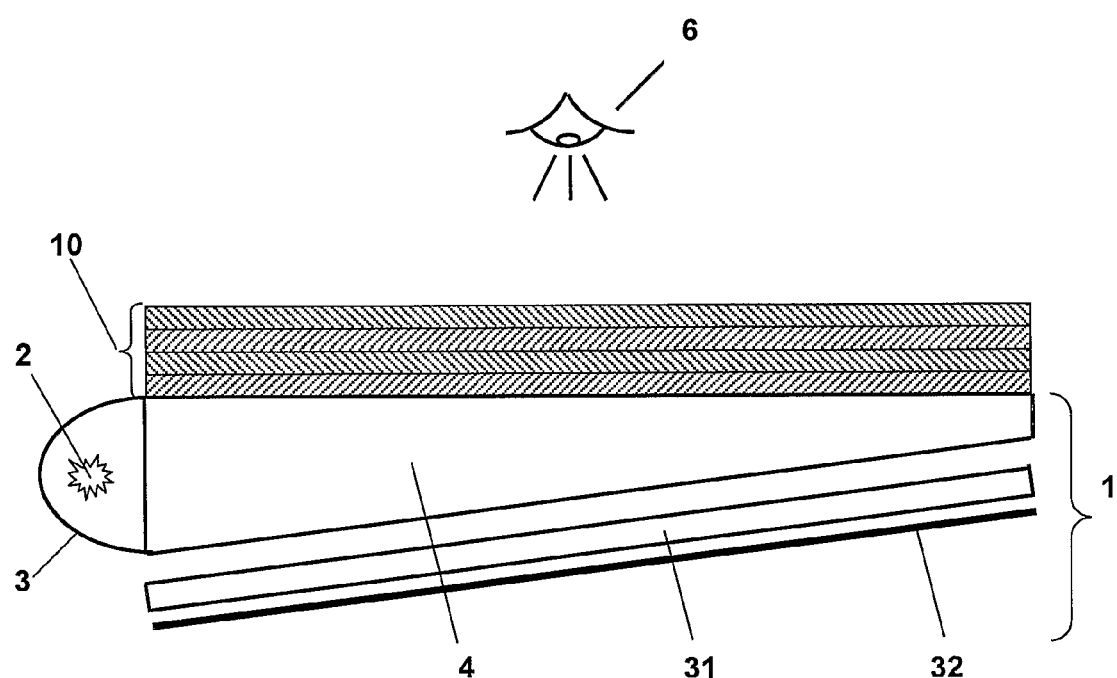
FIG. 2 is a schematic diagram of a backlight module according to another embodiment of the present invention.

FIG. 2 shows a cross section of the backlight module according to one embodiment of the present invention. In this embodiment the optical cavity 1 of the edge backlight type comprises a light source 2 semi-surrounded by a lamp cavity reflector 3. The light source 2 can be of any type, for example, a fluorescent lamp, incandescent lamp, solid-state source, electroluminescent (EL) device, etc. Although the embodiments described below typically include one such source, it will be understood that a backlight system according to the present invention could include two or more sources located at the same or different positions and combined so as to provide the required amount of light. In the preferred embodiment the light source 2 comprises a source emitting light having randomized polarization. The light from the light source 2 is coupled to the light guide 4 where it propagates. The optical cavity comprises a quarter-wave retarder layer 31 and mirror layer 32. The mirror layer may be a diffuse-reflecting layer.

Figure 3:
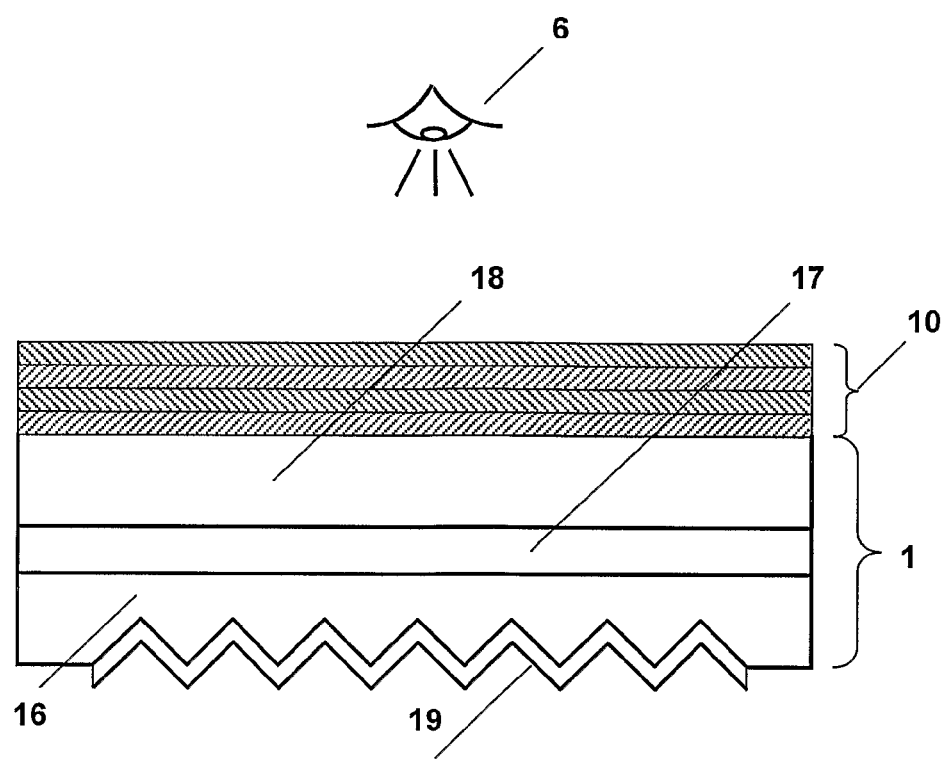
FIG. 3 is a schematic diagram of a backlight module according to another embodiment of the present invention; the backlight module comprises multilayer polarizer, a two-sided electroluminescent panel, and a transparent substrate.

FIG. 3 shows a cross section of the backlight module according to another embodiment of the present invention. The backlight module is a layered structure comprising an optical cavity 1 and a multilayer polarizer 10. The optical cavity includes a rear plate 16, a two-sided electroluminescent panel 17, and a transparent substrate 18. The rear plate 16 has a ridged rear surface covered with a reflective retardation film 19, which converts the light beams incident thereto in terms of polarization and reflects the converted light beams toward multilayer polarizer 10. In this embodiment, the groove angle between any two neighboring ridges on the ridged rear surface of rear plate 16 is 90°. However, any other groove angle suitable for reflection of the light beams thereto can be utilized. Multilayer polarizer 10 allows light beams with predetermined polarization state to be transmitted through and the beams with other polarizations to be reflected. For example, a structure of stacked layers can be utilized as multilayer polarizer according to the present invention, so that the polarized light beam with one predetermined polarization state will be transmitted through the structure of stacked layers and the polarized light beam with another predetermined polarization state will be reflected. In consideration of the production technology, the substrate 18 can be made of any suitable optical material, for example, plastic or any type of glass.

Figure 4:
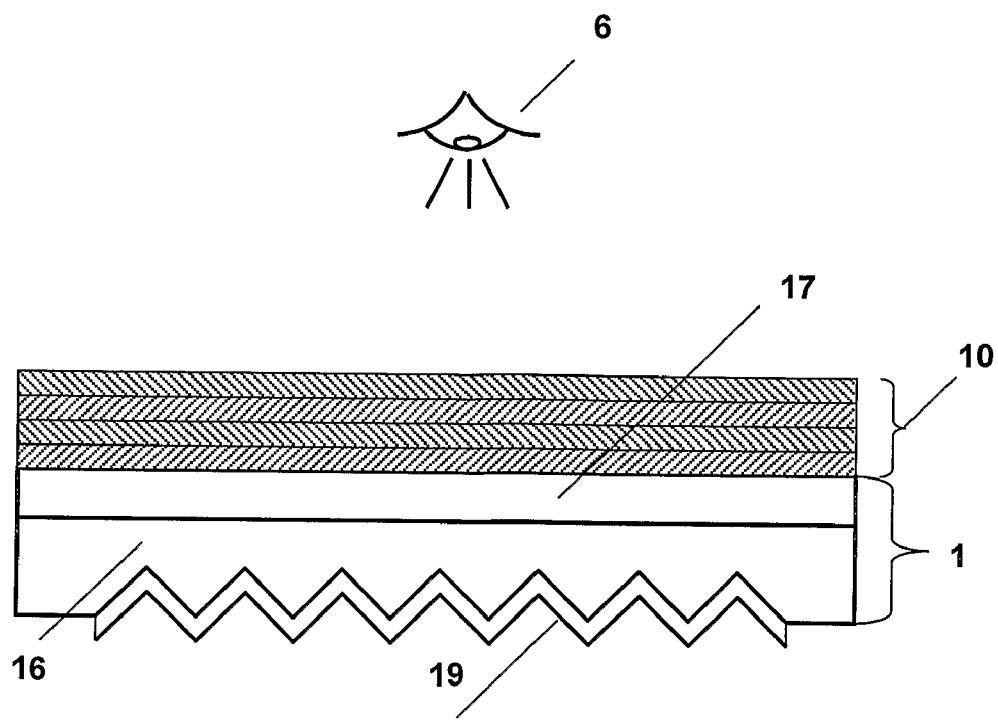
FIG. 4 is a schematic diagram of a backlight module according to another embodiment of the present invention, comprising multilayer polarizer, and a two-sided electroluminescent panel.

FIG. 4 shows a cross section of the backlight module according to another embodiment of the present invention. The backlight module is a layered structure comprising optical cavity 1 and multilayer polarizer 10. The optical cavity comprises a rear plate 16 and a two-sided electroluminescent panel 17. The rear plate 16 has a ridged lower surface covered with a reflective retardation film 19, which converts the light beams incident thereto in terms of polarization and reflects the converted light beams toward multilayer polarizer 10. In this embodiment, the groove angle between any two neighboring ridges on the ridged lower surface of the rear plate 16 is 90°. However, any other groove angle suitable for reflection of the light beams thereto can be utilized. The multilayer polarizer 10 allows light beams with predetermined polarization state to be transmitted through and the beams with other predetermined polarizations to be reflected.

Figure 5:
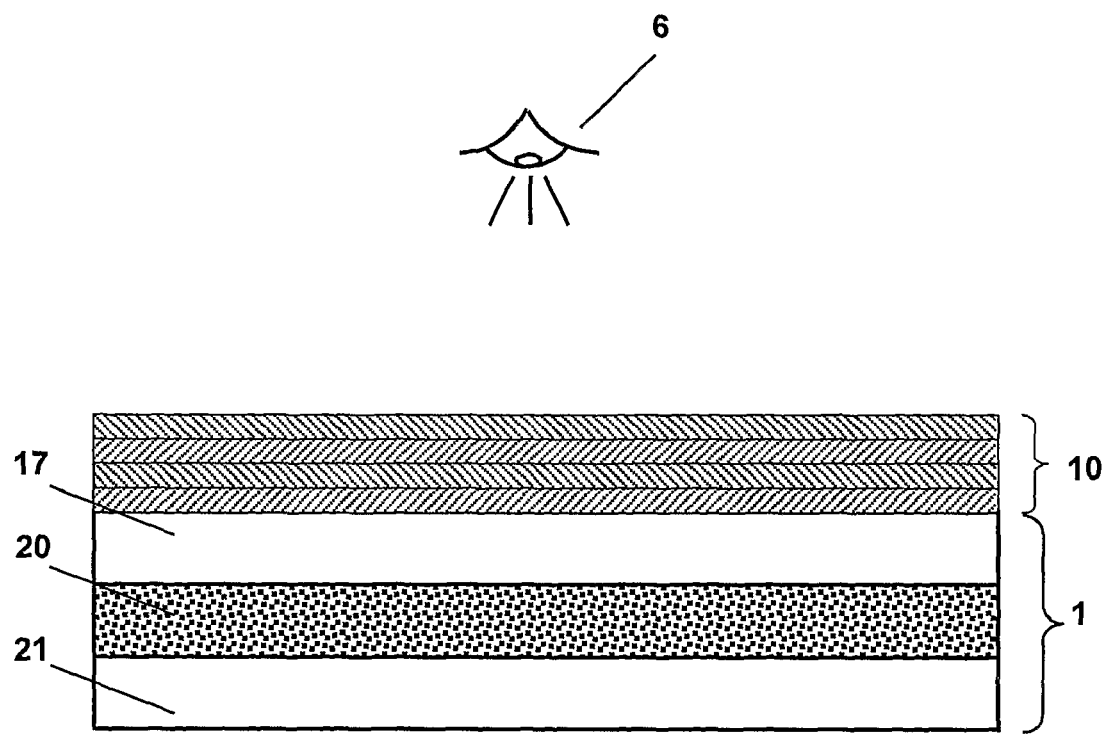
FIG. 5 is a schematic diagram of a backlight module according to another embodiment of the present invention; the backlight module comprises multilayer polarizer, a one-sided electroluminescent panel, and a light-scattering structure.

FIG. 5 shows a backlight module according to another embodiment of the present invention; the backlight module comprises a two-sided electroluminescent panel 17 and a light-scattering structure 20. A reflective film of high reflectivity 21 is provided on the rear surface of the scattering structure 20. The multilayer polarizer 10 is located between the observer 6 and the two-sided electroluminescent panel 17. Thus, the conversion of the polarization states of light beams according to the previous embodiments of the present invention may be achieved based on the scattering effect by the scattering structure 20. It should be noted that the scattering structure can be formed by a painting process or made of materials possessing different optical coefficients. In addition, the effect of scattering from this structure can be also achieved through a rough surface.

Figure 6:
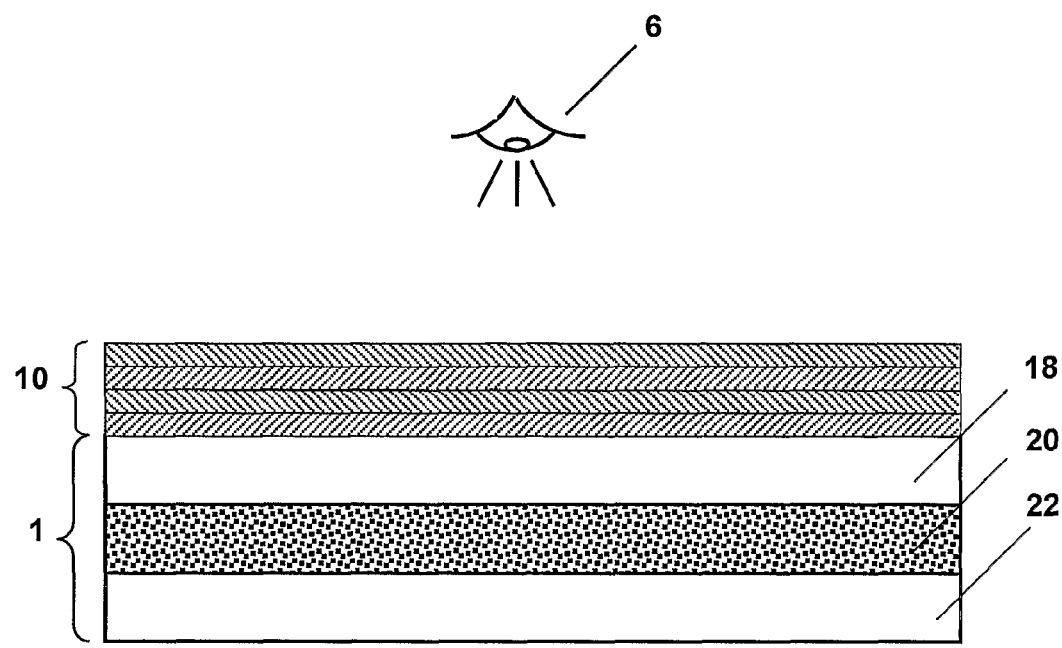
FIG. 6 is a schematic diagram of a backlight module according to another embodiment of the present invention; the backlight module comprises an assembly of light sources.

FIG. 6 shows a backlight module according to still another embodiment of the present invention. In this embodiment the light-scattering structure 20 is situated between the front surface of the one-sided electroluminescent panel 22 and the substrate 18, while the rear plate is omitted. Similarly, the conversion of the polarization states of light beams can be achieved through the scattering from structure 20. The multilayer polarizer 10 is located between the observer 6 and the substrate 18. In a further embodiment, the substrate 18 can be also omitted to further simplify the construction of the backlight module.

Figure 7:
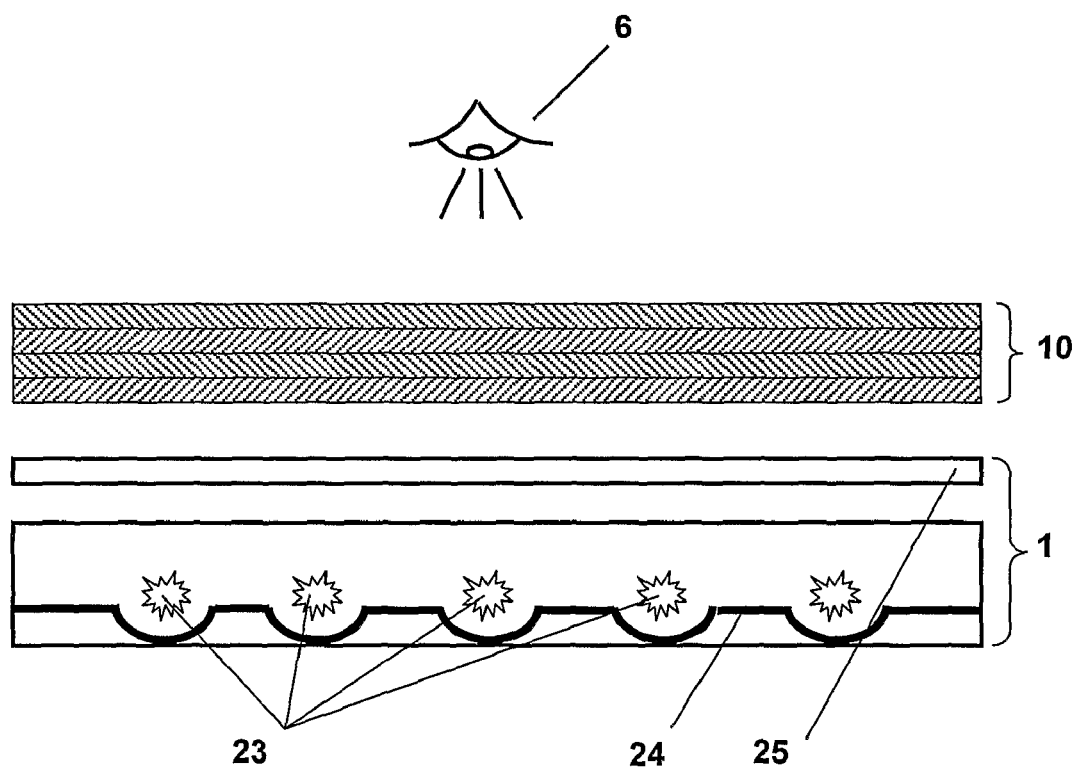
FIG. 7 is a schematic diagram of a backlight module according to another embodiment of the present invention; the backlight module comprises an assembly of light sources.

The backlight module presented in FIG. 7 comprises an optical cavity 1 and multilayer polarizer 10 situated between the observer 6 and the optical cavity 1. The optical cavity comprises a light source 23, reflector 24, and retardation plate 25 situated above the light source and reflector. The light source 23 is an assembly of light sources representing, for example, luminescent lamps or a LED matrix. Reflector 24 placed behind the backlight system provides for a more effective use of the source emission. The reflector can be of any type—specular or diffusive.

Figure 8:
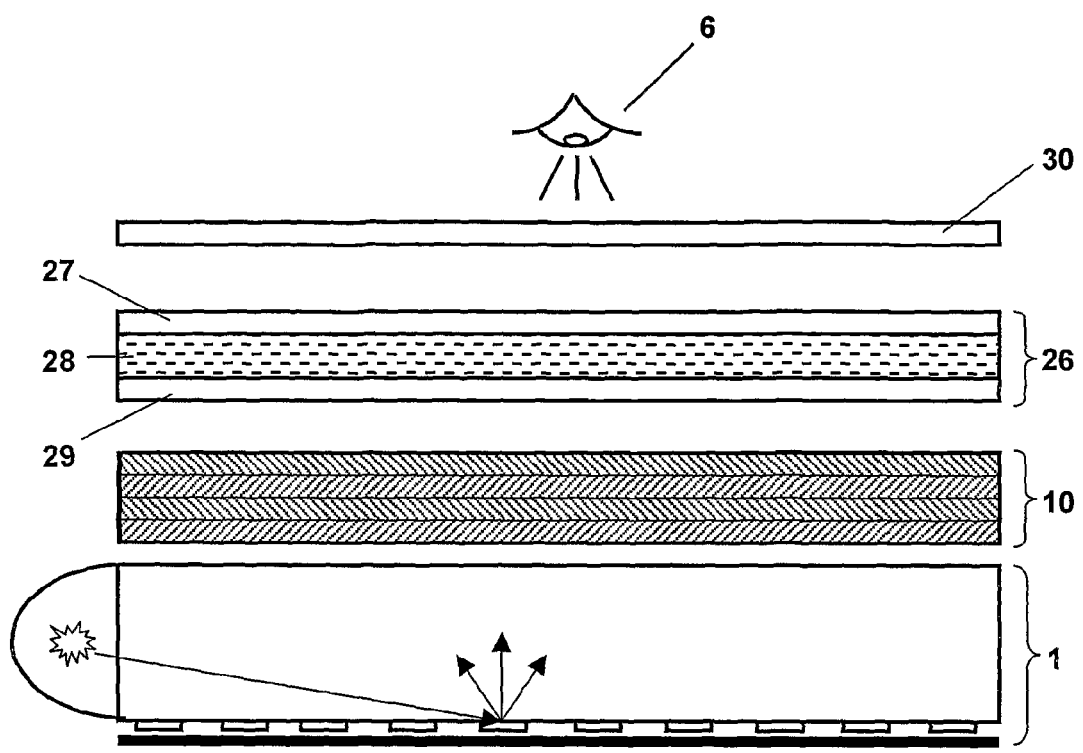
FIG. 8 is a schematic diagram of a liquid crystal display according to the present invention.

FIG. 8 shows a cross section of a liquid crystal display according to one embodiment of the present invention. In this embodiment, the optical cavity 1 is similar to the one described in FIG. 1. The multilayer polarizer 10 faces the front surface of the optical cavity 1. The liquid crystal display comprises the liquid crystal cell 26 comprising the front panel 27, the liquid crystal layer 28, and the back panel 29. The multilayer polarizer 10 of the backlight module faces the back panel 29 and serves as the back polarizer of the liquid crystal display. The front polarizer 30 faces the front panel 27 of the liquid crystal cell.

In order that the invention may be more readily understood, reference is made to the following examples, which are intended to be illustrative of the invention, but are not intended to be limiting in scope.

Desired performance of the multilayer polarizers can be achieved by manipulating the refractive index and thickness of each individual layer and the total number of layers. One of the important aspects of the multilayer polarizer design is selection of the base structure. Typically, the broadband multilayer polarizer can be designed in the form of a periodic structure of double layers with high and low refractive indices in the plane of polarization of the incident light. The same pair of layers is repeatedly added until the performance is satisfactory. The structure is of the form: $(HL)^{j-1}H$, where H and L denote the high- and low-index layers, biaxial layer and isotropic clear lacquer respectively, and j is the number of pairs. Here, we refer to such a structure as a cavity, which contains a total of j high-index layers. The structure yields maximum reflection at a specific wavelength, when the optical thickness (physical thickness multiplied by refractive index) is equal to an odd number times a quarter of the light wavelength (quarter-wave thickness).

FIGS. 9-12 show the simulated reflectance spectrum of a multilayer polarizer representing the case where the difference between high and low refractive indices in the plane of polarization is fixed at some value in the range between 0.3 and 1.0. Although designing a polarizer for a single wavelength is not the purpose, the result provides insight and guidelines for designing broadband reflectors.

FIG. 9 shows the polarizer reflectance as a function of the wavelength for a structure of one quarter-wave cavity containing 2, 3, 4, and 5H-layers (see the curves a, b, c and d respectively). The high index is fixed at 1.8 and the low index at 1.5, the substrate refractive index is 1.52. Therefore, FIG. 9 shows the impact of the number of layers on the performance of a system with such design. It is assumed that the materials are deposited onto a glass substrate having a refractive index of 1.5 and that light incident from air propagates through the multilayer structure and exits through the substrate. The optical thickness is a quarter of 550 nm. With only 4 high-index layers, the reflectance can reach approximately 52%. As the number of layers increases, the reflectance grows dramatically, and falls more abruptly from high values to an oscillatory level. For example, if the number of high-index layers is increased to 7, then the polarizer reflectance becomes as high as 80%. Further increase in the number of high-index layers to 10 leads to an additional increase in the reflectance to approximately 93%. It is necessary to note that the layer thickness may be too thin for accurate manufacturing control. In the visible wavelength range from 400 to 700 nm, the physical layer thickness is 55 to 97 nm for a refractive index of 1.8. The optical thickness can be increased to an odd number (e.g., 3 or 5) of quarter-wavelengths. However, increase in the layer thickness from 1 to 3 or 5 quarter-wavelengths decreases the bandwidth.

FIGS. 10 to 12 shows the simulated reflectance spectrum of a multilayer polarizer with the number of high-index layer varied from 2 to 5.

FIG. 10 shows the polarizer reflectance as a function of the wavelength for a structure of one quarter-wave cavity containing 2, 3, 4, and 5H-layers (see the curves a, b, c and d respectively). The high index is fixed at 1.85 and the low index at 1.5, the refractive index of the substrate is 1.52.

FIG. 11 shows the polarizer reflectance as a function of the wavelength for a structure of one quarter-wave cavity containing 2, 3, 4, and 5H-layers (see the curves a, b, c and d respectively). The high index is fixed at 2.0 and the low index at 1.5, the refractive index of the substrate is 1.52.

FIG. 12 shows the polarizer reflectance as a function of the wavelength for a structure of one quarter-wave cavity containing 2, 3, 4, and 5H-layers (see the curves a, b, c and d respectively). The high index is fixed at 2.5 and the low index at 1.5, the refractive index of the substrate is 1.52. The comparison with the spectrum of FIG. 9 demonstrates that both the reflectance and bandwidth increase with the increasing index contrast.

What is claimed is:

1. A backlight module, comprising
an optical cavity for reflecting and depolarizing light that is incident upon a front surface of said optical cavity, a multilayer polarizer comprising a plurality of layers,
wherein said multilayer polarizer faces the front surface of the optical cavity and the layers are arranged in such a way that a light of polarization substantially parallel to the transmission axis of said multilayer polarizer is substantially transmitted and the light substantially orthogonal polarization is substantially reflected by said multilayer polarizer in at least one predetermined wavelength subrange of the visible wavelength range, and
wherein at least one of said layers comprises rod-like supramolecules forming at least partially a three-dimensional structure in the layer, and
said rod-like supramolecules comprise at least one polycyclic organic compound with a conjugated π-system and functional groups which are capable of forming non-covalent bonds between said supramolecules, said non-covalent bonds are selected from the group consisting of H-bonds and coordination bonds.

2. A backlight module according to claim 1, wherein the at least one organic compound is heterocyclic.

3. A backlight module according to claim 1, wherein at least one of said layers is water non-soluble.

4. A backlight module according to claim 1, wherein at least one of said layers is optically biaxial.

5. A backlight module according to claim 1, wherein the rod-like supramolecules are oriented substantially parallel or perpendicular to the front surface of the optical cavity.

6. A backlight module according to claim 1, wherein at least one of the non-covalent bonds is a H-bond.

7. A backlight module according to claim 1, wherein at least one of the non-covalent bonds is a coordination bond.

8. A backlight module according to claim 1, wherein the organic compound has a general structural formula I

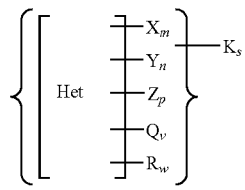

(I)

where Het is an at least partially conjugated substantially planar heterocyclic molecular system,
  X is a carboxylic group —COON,
  m is 0, 1, 2, 3 or 4;
  Y is a sulfonic group —SO$_3$H,
  n is 0, 1, 2, 3 or 4;
  Z is an amide of a carboxylic acid group,
  p is 0, 1, 2, 3 or 4;
  Q is an amide of a sulfonic acid group,
  v is 0, 1, 2, 3 or 4;
  K is a counterion;
  s is the number of counterions providing neutral state of the molecule;
  R is a substituent selected from the list comprising CH$_3$, C$_2$H$_5$, NO$_2$, Cl, Br, F, CF$_3$, CN, OH, OCH$_3$, OC$_2$H$_5$, OCOCH$_3$, OCN, SCN, NH$_2$, and NHCOCH$_3$,
  w is 0, 1, 2, 3 or 4,
wherein if the integer m is equal to 0, then both n and p are not equal to 0, and if the integer n is equal to 0, then the integer m is equal to or greater than 1.

9. A backlight module according to claim 8, wherein Het is substantially transparent in the visible spectral range.

10. A backlight module according to claim 8, wherein Het has the general structural formula from the list comprising structures II to XLII:

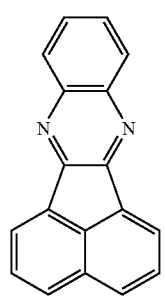

(II)

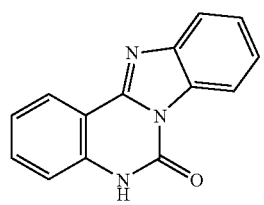

(III)

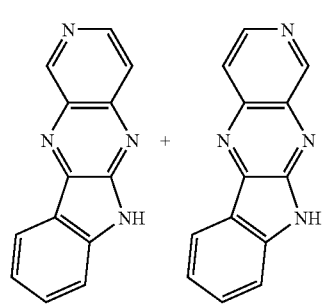

(IV)

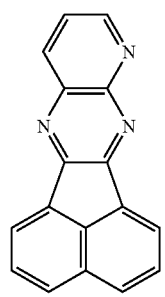

(V)

-continued
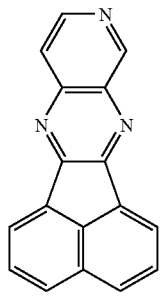
(VI)
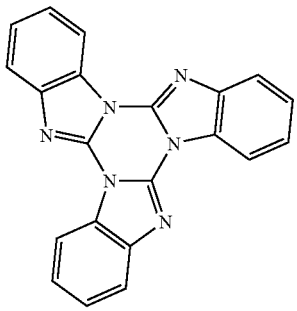
(VII)
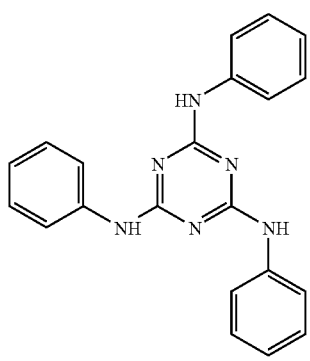
(VIII)
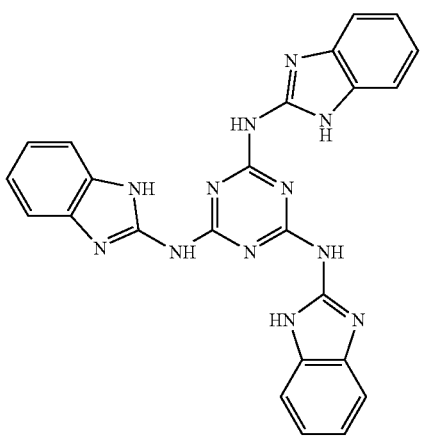
(IX)
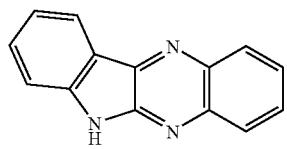
(X)
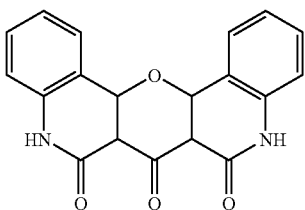
(XI)
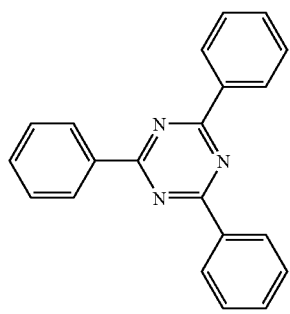
(XII)
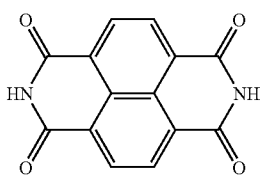
(XIII)
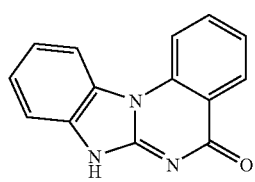
(XIV)

(XV)
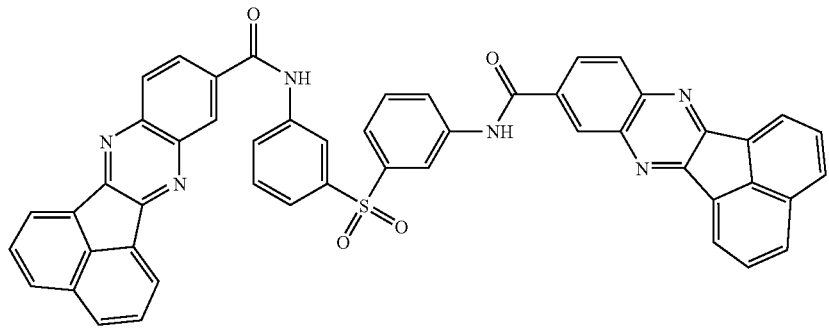
(XVI)
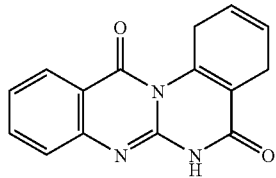
(XVII)
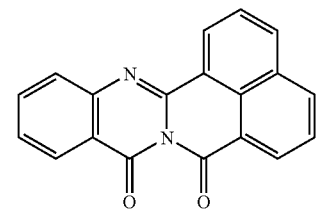
(XVIII)
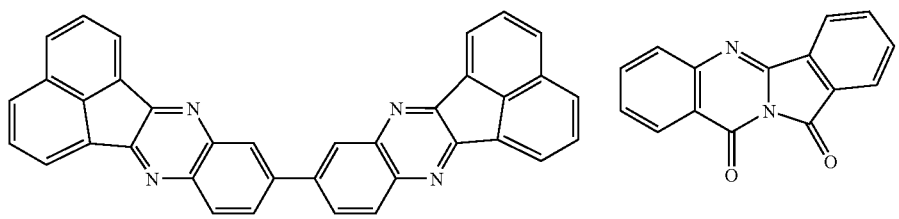
(XIX)
(XX)
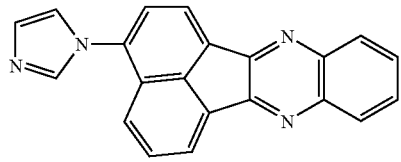
(XXI)
(XXII)
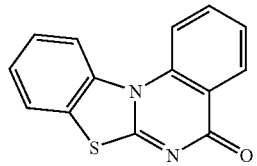
(XXIII)
(XXIV)
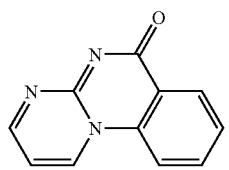
(XXV)
(XXVI)
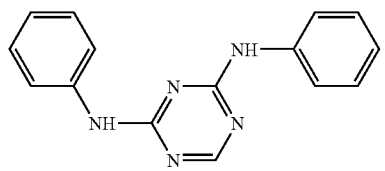
(XXVII)
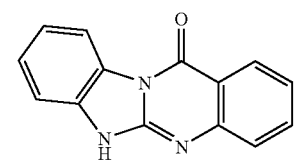

-continued
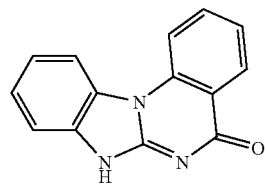
(XXVIII)
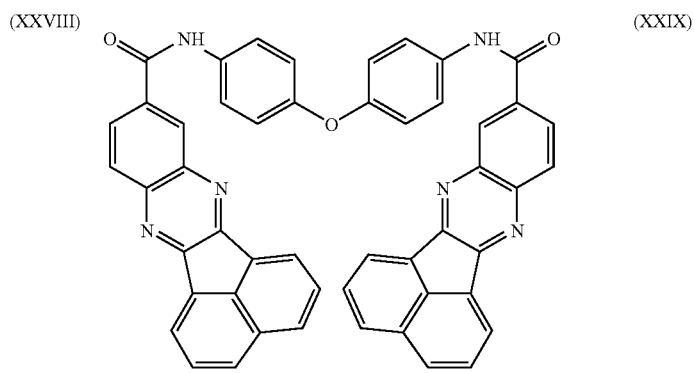
(XXIX)
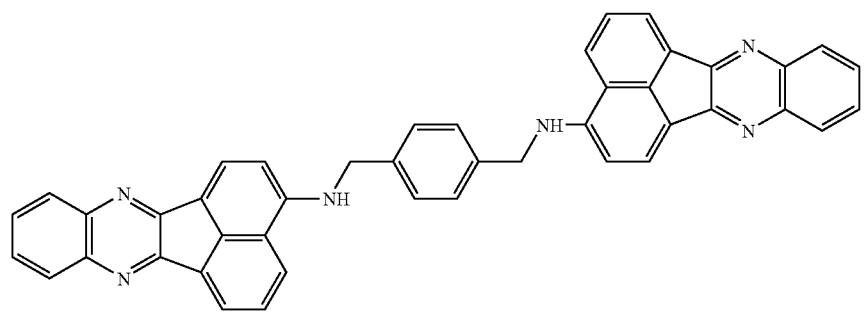
(XXX)
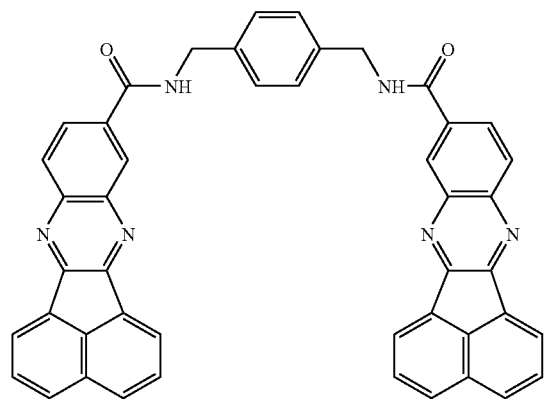
(XXXI)
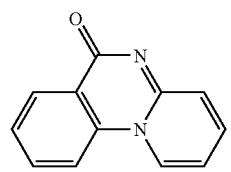
(XXXII)
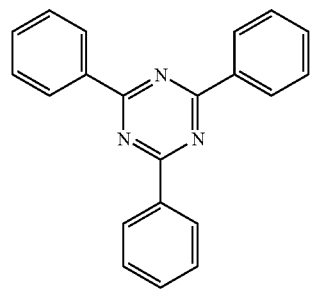
(XXXIII)
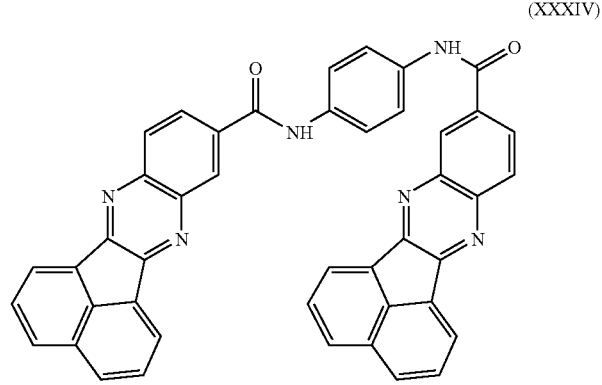
(XXXIV)

-continued
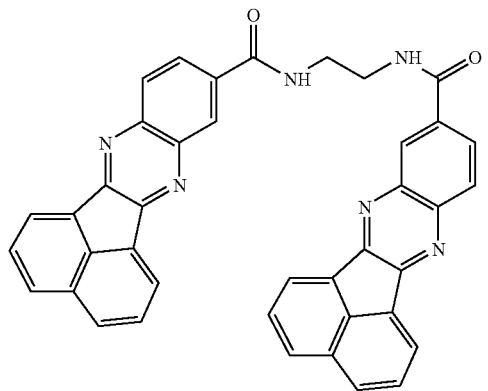 (XXXV)
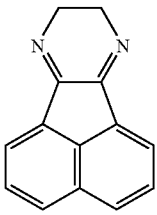 (XXXVI)
 (XXXVII)
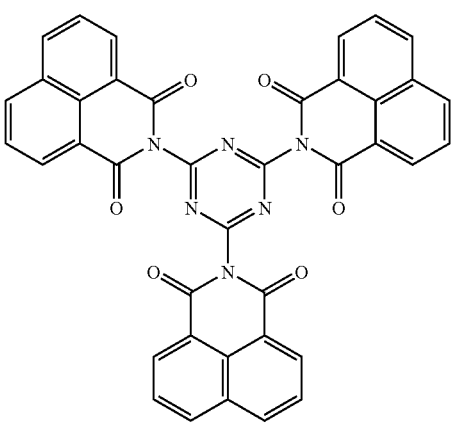 (XXXVIII)
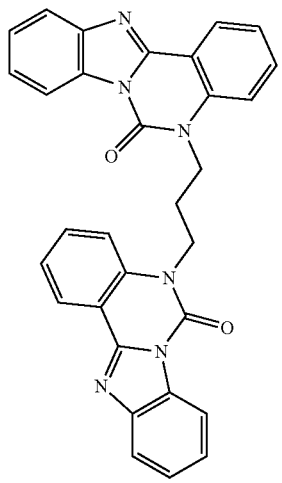 (XXXIX)
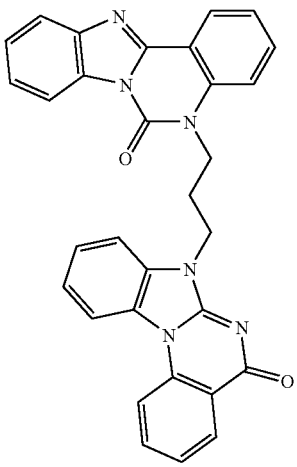 (XL)
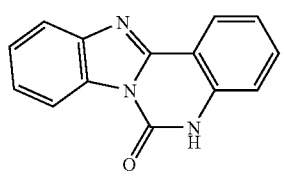 (XLI)
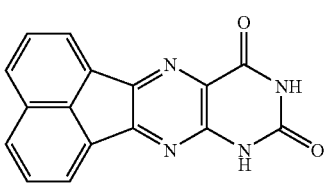 (XLII)

11. A backlight module according to claim 8, wherein the counterion is selected from the list comprising $H^+$, $NH_4^+$, $Na^+$, $K^+$, $Li^+$, $Ba^{++}$, $Ca^{++}$, $Mg^{++}$, $Sr^{++}$, $Zn^{++}$.

12. A backlight module according to claim 1, wherein the organic compound is acenaphthoquinoxaline derivative comprising a carboxylic group and has a general structural formula corresponding to one of structures 1 to 7:

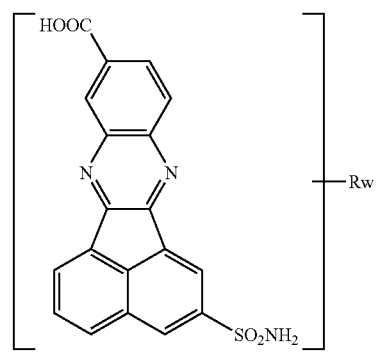
(1)

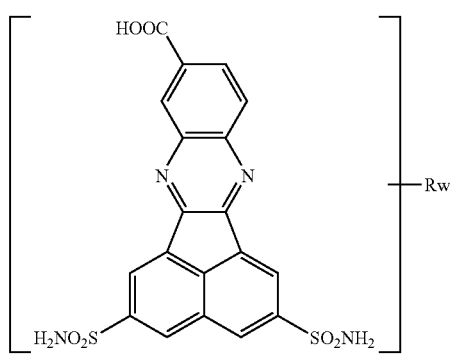
(2)

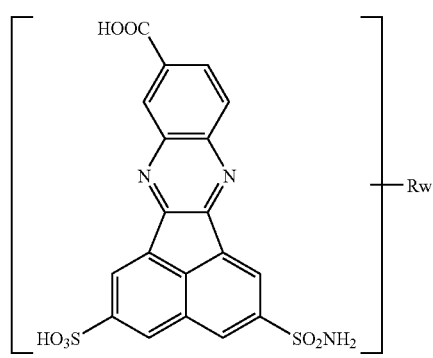
(3)

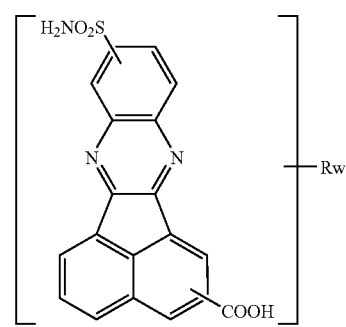
(4)

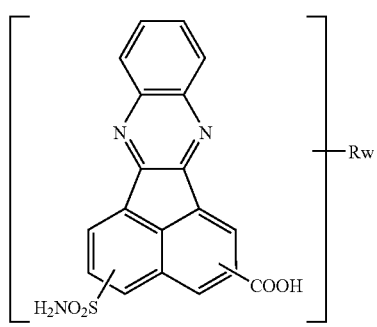
(5)

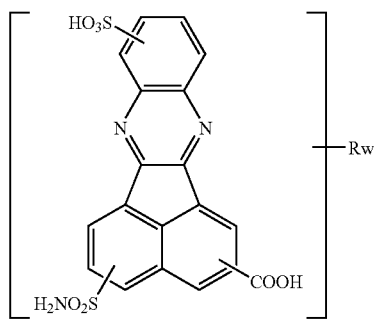
(6)

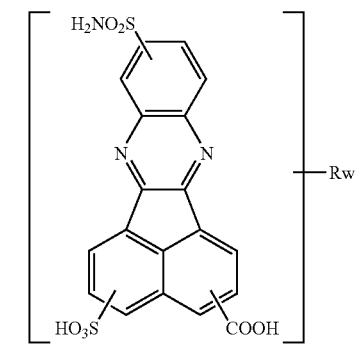
(7)

13. A backlight module according to claim 1, wherein the organic compound is an acenaphthoquinoxaline derivative comprising one or two sulfonic groups and having a general structural formula corresponding to structures 8 to 19:

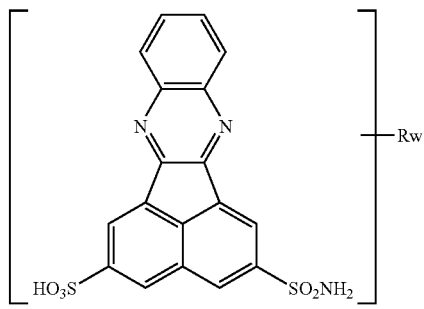
(8)

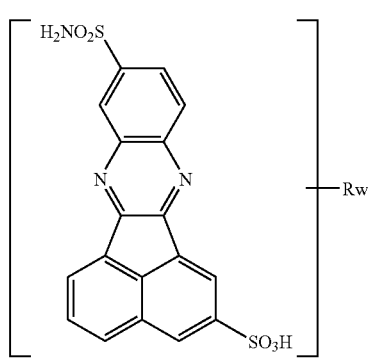
(9)
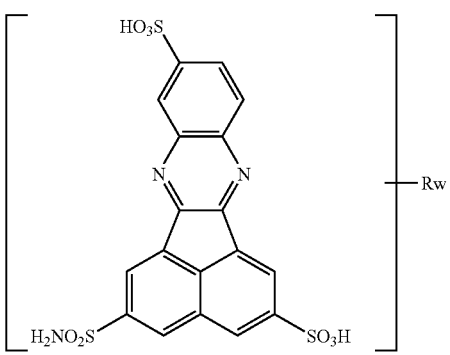
(13)
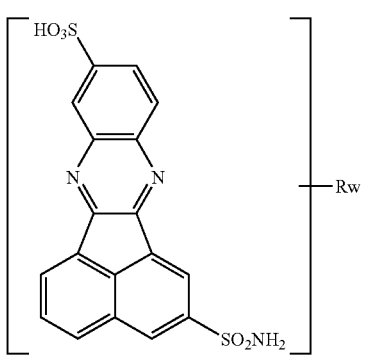
(10)
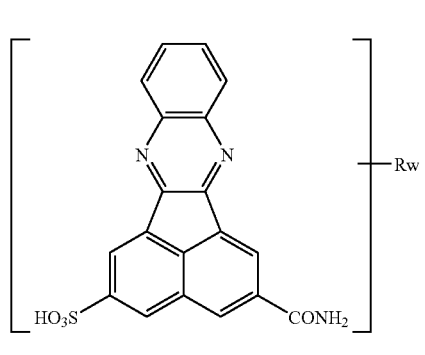
(14)
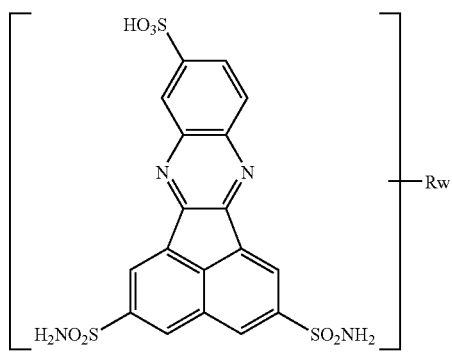
(11)
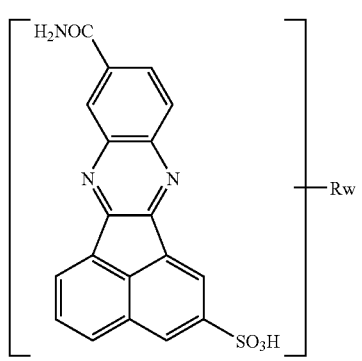
(15)
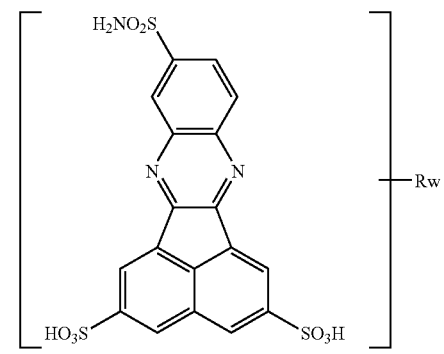
(12)
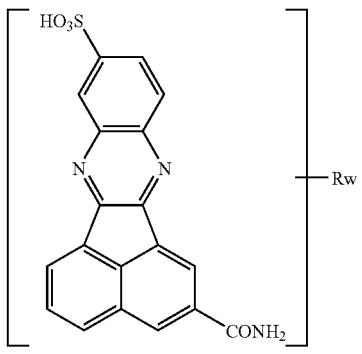
(16)

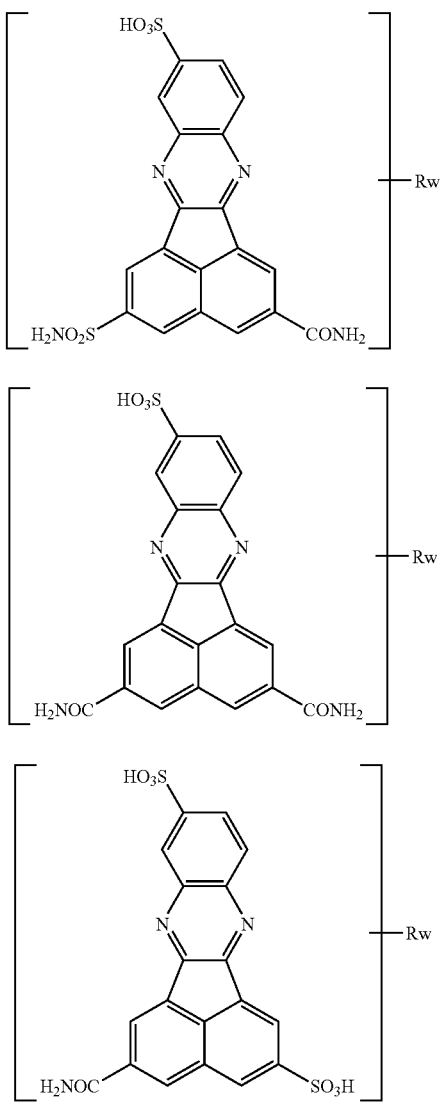
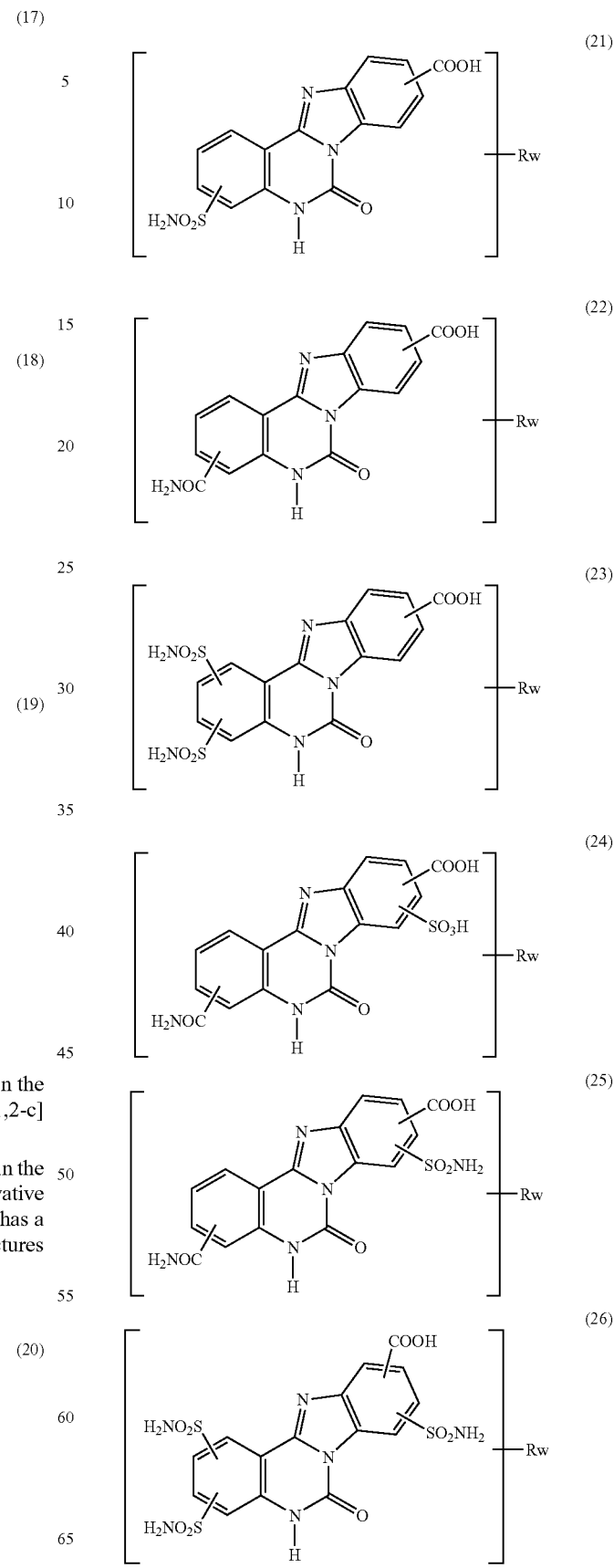
14. A backlight module according to claim 1, wherein the organic compound is a 6,7-dihydrobenzimidazo[1,2-c]quinazolin-6-one derivative.
15. A backlight module according to claim 14, wherein the 6,7-dihydrobenzimidazo[1,2-c]quinazolin-6-one derivative comprises one or two carboxylic groups —COOH and has a general structural formula corresponding to one of structures 20 to 32:
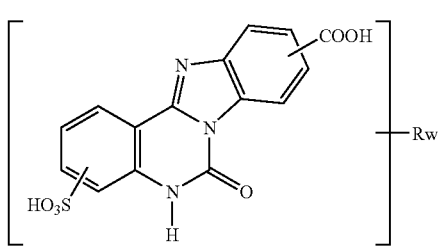

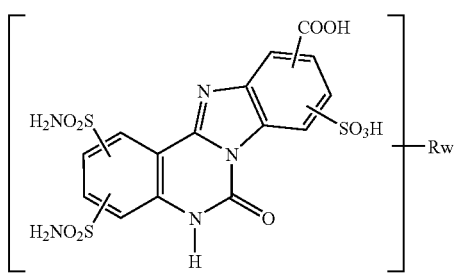 (27)
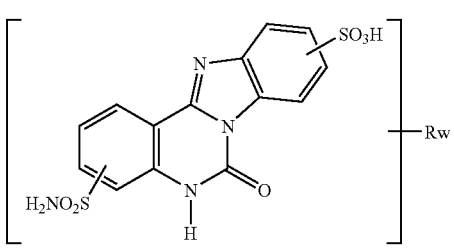 (33)
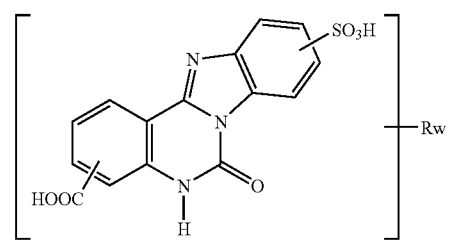 (28)
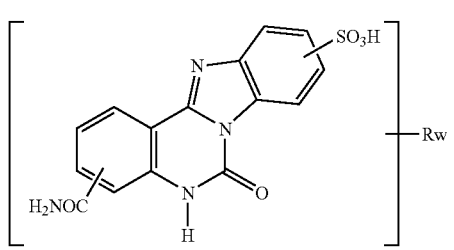 (34)
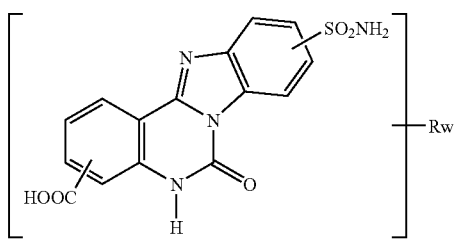 (29)
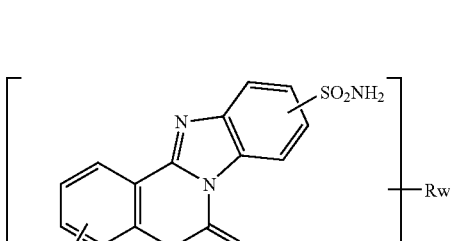 (35)
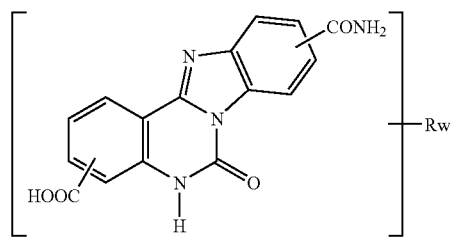 (30)
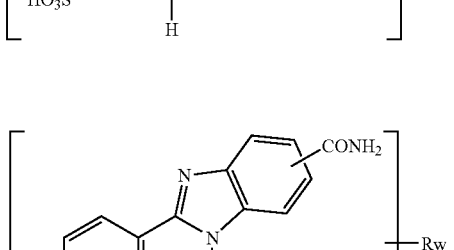 (36)
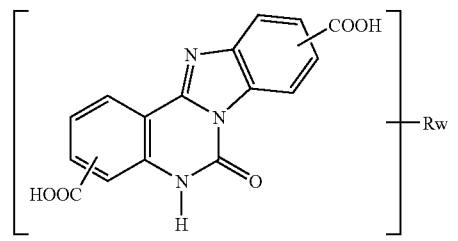 (31)
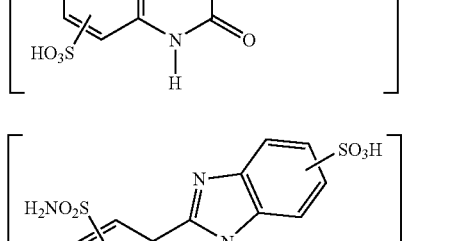 (37)
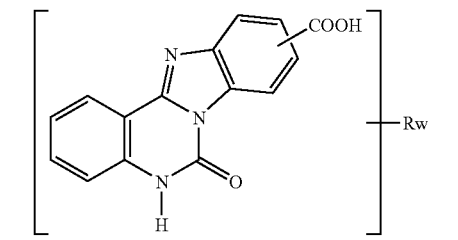 (32)
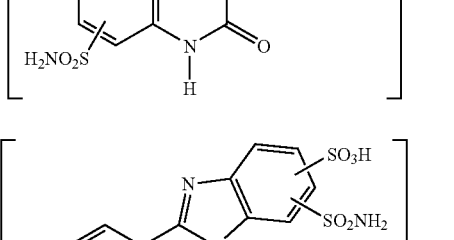 (38)
16. A backlight module according to claim 15, wherein the 6,7-dihydrobenzimidazo[1,2-c]quinazolin-6-one derivative comprises a sulfonic group —SO$_3$H and has a general structural formula from the list comprising structures 33 to 41:

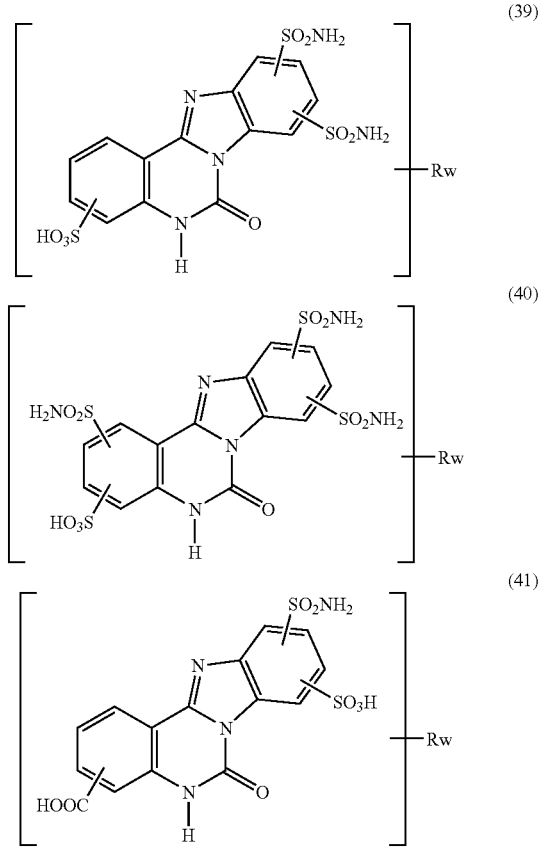

17. A backlight module according to claim 14, wherein the 6,7-dihydrobenzimidazo[1,2-c]quinazolin-6-one derivative comprises at least one acid amide group.

18. A backlight module according to claim 17 wherein the at least one acid amide group is a carboxyamide group ($CONH_2$).

19. A backlight module according to claim 17 wherein the at least one acid amide group is a sulfonamide group ($SO_2NH_2$).

20. A backlight module according to claim 1, wherein said plurality of layers comprises alternated optically biaxial and isotropic layers.

21. A backlight module according to claim 20, wherein at least one isotropic layer comprises at least two sublayers made of materials having different indices of refraction.

22. A backlight module according to claim 1, wherein the multilayer polarizer is capable of polarizing light in the entire range of incident angles.

23. A backlight module according to claim 1, wherein the thickness of each layer is approximately equal to a quarter-wave and the total thickness of the plurality of layers does not exceed approximately 5 micrometers.

24. A backlight module according to claim 1, wherein a number of layers in the plurality of layers does not exceed 20.

25. A backlight module according to claim 1, wherein the supramolecules comprise two or more of said polycyclic organic compounds.

26. A backlight module according to claim 1, wherein at least one layer of the multilayer polarizer is made of a fluorescent material converting ultraviolet radiation into visible light.

27. A backlight module according to claim 1, wherein at least one layer of the multilayer polarizer has a fundamental absorption edge below 400 nm.

28. A backlight module according to claim 1, wherein the multilayer polarizer has a transmission coefficient of not less than 0.98.

29. A backlight module according to claim 1, wherein the optical cavity further comprises
at least one light source semi-surrounded by a lamp cavity reflector; a light guide having an edge facing the light source and a front surface facing the multilayer polarizer;
a diffuse-reflecting structure disposed onto the rear surface of the light guide; and
a mirror layer situated under the diffuse-reflecting structure.

30. A backlight module according to claim 29, wherein the light source is selected from the list comprising a fluorescent lamp, incandescent lamp, solid-state source, and electroluminescent (EL) device.

31. A backlight module according to claim 29, wherein the mirror layer is a diffuse-reflecting layer.

32. A backlight module according to claim 1, wherein the optical cavity further comprises
at least one light source semi-surrounded by a lamp cavity reflector;
a light guide having an edge facing the light source and a front surface facing the multilayer polarizer;
a quarter-wave retarder layer disposed onto the rear surface of the light guide; and
a mirror layer situated under the quarter-wave retarder layer.

33. A backlight module according to claim 32, wherein the light source is selected from the list comprising a fluorescent lamp, incandescent lamp, solid-state source, and electroluminescent (EL) device.

34. A backlight module according to claim 32, wherein the mirror layer is a diffuse-reflecting layer.

35. A backlight module according to claim 1, wherein the optical cavity further comprises
a rear plate having a front surface facing the front surface of the optical cavity and a ridged rear surface;
a reflective retardation film on the ridged rear surface of the rear plate; and
a two-sided electroluminescent panel facing the front surface of the rear plate.

36. A backlight module according to claim 35 wherein a transparent substrate is situated on the two-sided electroluminescent panel.

37. A backlight module according to claim 1, wherein the optical cavity further comprises
a scattering structure having a front surface facing the front surface of the optical cavity and a rear surface,
a reflective film located on the rear surface of the scattering structure, and
a two-sided electroluminescent panel facing the front surface of the scattering structure.

38. A backlight module according to claim 1, wherein the optical cavity further comprises
a scattering structure having a front surface and a rear surface, wherein the front surface is facing the front surface of the optical cavity,
a substrate situated on the front surface of the scattering structure, and
a one-sided electroluminescent panel situated on the rear surface of the scattering structure.

39. A backlight module according to claim 1, wherein the optical cavity further comprises a light guide having a front surface facing the front surface of the optical cavity, a rear surface, and an edge;

a light source optically connected to the edge of the light guide for emitting light into the light guide;

a retardation film located on the front surface of the light guide, and a rear reflector is proximate to the rear surface of the light guide and comprising a reflective film which reflects at least about 80% of normally incident light and at least about 80% of the light incident at an angle of 60 degrees from normal.

* * * * *